United States Patent
Sato et al.

[11] Patent Number: 6,141,161
[45] Date of Patent: Oct. 31, 2000

[54] MAGNETIC CARD RECORDING/ REPRODUCING APPARATUS AND METHOD

[75] Inventors: Hitoshi Sato, Tokorozawa; Shinichi Akiyama, Akishima; Akira Utsui, Kawaguchi, all of Japan

[73] Assignee: Neuron Corporation, Tokyo, Japan

[21] Appl. No.: 09/152,292

[22] Filed: Sep. 14, 1998

[30] Foreign Application Priority Data

Aug. 3, 1998 [JP] Japan ................... 10-218756

[51] Int. Cl.[7] .................................. G11B 25/04
[52] U.S. Cl. ................ 360/2; 235/449; 235/493
[58] Field of Search .................... 235/449, 493; 360/2

[56] References Cited

U.S. PATENT DOCUMENTS 5,479,532 12/1995 Abel et al. .................. 360/2

*Primary Examiner*—Harold I. Pitts
*Attorney, Agent, or Firm*—Sughrue, Mion, Zinn, Macpeak & Seas, PLLC

[57] ABSTRACT

According to the presents invention, there are provided a magnetic card recording/reproducing apparatus comprising a coercive force identifier for identifying the coercive force of a magnetic card before magnetic information is recorded in the magnetic card, and an exciting current selector for selecting one of plural preset exciting current values as exciting current to be supplied to a recording magnetic head on the basis of the identification result of the coercive force identifier to record the magnetic information, and a magnetic card recording/reproducing method for recording/ reproducing magnetic information in a magnetic card, which comprises the steps of: identifying the coercive force of the magnetic card before magnetic information is recorded in the magnetic card, and selecting one of plural predetermined exciting current values as exciting current to be supplied to a recording magnetic head for recording the magnetic information in the magnetic card on the basis of the identification result of the coercive force identifying step so that the magnetic information will be recorded in the magnetic card with the exciting current thus selected.

27 Claims, 16 Drawing Sheets

MAGNETIC CARD RECORDING/ REPRODUCING APPARATUS AND METHOD

BACKGROUND OF THE INVENTION

1. Field of the Invention

The present invention relates to magnetic card recording/ reproducing apparatus and method for recording/ reproducing magnetic information into/from a magnetic card.

2. Description of the Related Art

Recently, magnetic cards such as credit cards, bank cards, etc. have generally propagated as if these cards are indispensable for daily life. On the other hand, electric equipment from which magnetic flux necessarily leaks, personal ornaments for health in which magnetic field is positively generated, etc. have been put in the market, and these elements have frequently induced various troubles such as destruction of data stored in magnetic cards, instability of data (making the memory state unstable), etc.

In order to avoid these troubles, a magnetic card which is protected from being effected by magnetic field around it by increasing the coercive force thereof starts to appear. For example, the coercive force of magnetic cards specified in JIS1 type or credit cards is set to 300 oersted, and the coercive force of bank cards in Japan is set to 650 oersted. In the case of magnetic cards which are mainly put in the European and American markets, the coercive force of these magnetic cards is set to 1750 oersted or 2750 oersted, and further a magnetic card whose coercive force is enhanced to 4000 oersted to enhance the protection function starts to appear. Further, in Japan, magnetic cards whose coercive force is enhanced to the same level as the European and American magnetic cards are used as high-way cards, telephone cards, etc.

Most of the above-described magnetic cards are designed substantially in the same outer dimension, and thus if a magnetic recording/reproducing apparatus is commonly used for magnetic cards having various different coercive forces, this is extremely favorable. However, any magnetic card recording/reproducing apparatus supporting magnetic cards which are different in coercive force has not been put in the market from the viewpoint of the cost, the complication of structure, etc. The reason for this will be described with reference to FIG. 1.

FIG. 1 is a diagram showing the recording status of magnetic information in a magnetic card. In FIG. 1, a core 1 constituting a substantially ring-shaped magnetic head is formed of magnetic material, and it is designed to have a gap 12 of about 20 to 40 μm (in order to make easier the understanding of the present invention, the gap is illustrated as being larger than the actual gap in the drawings) at the tip portion thereof and wound by a coil 2 at the base portion thereof. The coil 2 is connected to a current generator 4 for generating and supplying exciting current at a recording time of magnetic information through a matching unit 3 which performs impedance matching as well as amplification of the exciting current. A magnetic stripe 6 coated with magnetic material is adhesively attached to a magnetic card 5, and it is fed in the direction indicated by an arrow a at a constant speed, for example.

When exciting current flows in the coil 2, magnetic flux 13 corresponding to magnetomotive force occurs. In this case, magnetic flux directing in the direction indicated by a solid-line arrow or magnetic flux directing in the direction indicated by a broken-line arrow occurs in accordance with the direction of the current. The magnetic flux 13 forms magnetic field which expands in the neighborhood of the gap of the core 1. By intermittently supplying positive or negative pulse current to the coil 2 in accordance with the feeding of the magnetic card 5, magnetized areas 9, 10, 11 are formed in the magnetic stripe 6 in accordance with the polarity of the magnetic field.

When the magnetized areas are formed, that is, the magnetic information is recorded, the peak value of the pulse current supplied to the coil 2 is determined in accordance with the coercive force of the magnetic stripe 6. Accordingly, when a magnetic card 5 having small coercive force is inserted into a magnetic card recording/reproducing apparatus which is designed to support magnetic cards having large coercive force and then pulse current having a large peak value is supplied to the coil 2, magnetic field 8' which expands in the feeding direction of the magnetic card affects the magnetized area 9 or 10 in which the magnetic information has been already recorded. For example, when the polarity of the exciting current is inverted, the magnetization state is deteriorated or lost. On the other hand, when a magnetic card 5 having large coercive force is inserted into a magnetic card recording/reproducing apparatus which is designed to support magnetic cards having small coercive force, the intensity of the magnetic field which is generated by the pulse current is insufficient, and thus it is impossible to record the magnetic information.

Therefore, in order to attain a magnetic card recording/ reproducing apparatus which can support various magnetic cards that are different in coercive force, a recording/ reproducing system having plural recording magnetic cards which are respectively designed to support respective magnetic cards having different coercive forces must be provided, and thus it is difficult to implement the magnetic card recording/reproducing apparatus.

SUMMARY OF THE INVENTION

The present invention has been implemented in view of the foregoing situation, and has an object to provide a magnetic card recording/reproducing apparatus which can record magnetic information on various magnetic cards having different coercive forces by using a single recording magnetic head.

In order to attain the above object, according to the present invention, a magnetic card recording/reproducing apparatus is characterized by comprising a coercive force identifier for identifying the coercive force of a magnetic card before magnetic information is recorded in the magnetic card, and an exciting current selector for selecting one of plural preset exciting current values as exciting current to be supplied to a recording magnetic head on the basis of the identification result of the coercive force identifier to record the magnetic information.

According to the above magnetic card recording/ reproducing apparatus, by using only one magnetic card recording/reproducing apparatus, the recording of magnetic information can be performed on various magnetic cards which are different in coercive force.

In the above magnetic card recording/reproducing apparatus, the coercive force identifier may include a pulse current supplier for supplying the recording magnetic head with pulse current at a predetermined period to record predetermined magnetic information for identifying the coercive force of the magnetic card, the pulse current being set to have a peak value which varies substantially linearly in accordance with the time lapse of feeding of the magnetic card; an AC voltage detector for detecting an inductive voltage which is induced in accordance with the predetermined magnetic information recorded in the magnetic card in the reproducing magnetic head; and a comparator for identifying the coercive force of the magnetic card on the basis of a judgment as to whether the output of the AC voltage detector exceeds a predetermined reference value more early than a predetermined time.

In the above magnetic card recording/reproducing apparatus, the exciting current supplier may include at least two recording current suppliers to supply one of at least two exciting current values which are different in amplitude, and a switching unit for selecting one of the at least two recording current suppliers through a switching operation thereof.

The above magnetic card recording/reproducing apparatus may be provided with a thickness sensor for detecting the thickness of the magnetic card, and a contact-pressure adjustment unit for adjusting, in accordance with the thickness of the magnetic card detected by the thickness sensor, the pressure to be applied to the recording magnetic head and the reproducing magnetic head which are brought into contact with the magnetic card.

According to the above magnetic card recording/ reproducing apparatus, magnetic information can be recorded in various magnetic cards by a single magnetic card recording/reproducing apparatus even when the magnetic cards are different in thickness.

In the above magnetic card recording/reproducing apparatus, the magnetic card may have plural magnetic stripes which are respectively coated with magnetic materials having different coercive forces and adhesively attached to one another in a laminate structure, or may have a magnetic stripe coated with plural magnetic materials which are mixed with one another and different in coercive force. In this case, the amount of magnetic information which can be recorded in a magnetic card can be greatly increased. Further, the secrecy of the magnetic card can be enhanced.

In the above magnetic card recording/reproducing apparatus, the coercive force identifier may further include an identifying magnetic head to which an AC voltage having a fixed amplitude is applied, and identifies the coercive force of the magnetic card by detecting variation of the magnetic reluctance of said identifying magnetic head which occurs when the magnetic card is fed so as to be far away from or approach to the identifying magnetic head.

According to the above magnetic card recording/ reproducing apparatus, there can be achieved not only an effect that magnetic information can be recorded on various magnetic cards by using only one magnetic card recording/ reproducing apparatus even when the magnetic cards are different in coercive force, but also an effect that the identification of the coercive force of the magnetic card can be performed by only one insertion operation of the magnetic card.

According to the present invention, there is provided a magnetic card recording/reproducing method for recording/ reproducing magnetic information in a magnetic card, which is characterized by comprising the steps of: identifying the coercive force of the magnetic card before magnetic information is recorded in the magnetic card, and selecting one of plural predetermined exciting current values as exciting current to be supplied to a recording magnetic head for recording the magnetic information in the magnetic card on the basis of the identification result of the coercive force identifying step so that the magnetic information will be recorded in the magnetic card with the exciting current thus selected.

In the above magnetic card recording/reproducing method, the coercive force identifying step comprises the steps of: supplying the recording magnetic head with pulse current at a predetermined period to record predetermined magnetic information for identifying the coercive force of the magnetic card, the pulse current being set to have a peak value which varies substantially linearly in accordance with the time lapse of feeding of the magnetic card; detecting a pre-insertion inductive voltage which is induced in accordance with the predetermined magnetic information recorded in the magnetic card; and identifying the coercive force of the magnetic card on the basis of a judgment as to whether the inductive voltage detected in the detection step exceeds a predetermined reference value more early than a predetermined time.

In the above magnetic card recording/reproducing method, the coercive force identifying step further comprises steps of: detecting a first inductive voltage which is induced in a coil of a magnetic head dependently on the magnetic reluctance of the magnetic head when the magnetic card is far away from the magnetic head; and detecting a second inductive voltage which is induced in the coil of the magnetic head dependently of the magnetic reluctance when the magnetic card approaches to the magnetic head; comparing the first inductive voltage and the second inductive voltage; identifying the coercive force of the magnetic card on the basis of the comparison result of said comparing step; and selecting one of plural exciting current values as the optimum exciting current to be supplied to the magnetic head to record magnetic information in the magnetic card on the basis of the identification result of the identifying step.

According to the above magnetic card recording/ reproducing method, the magnetic information can be recorded in various magnetic cards with the exciting current optimum to the coercive force of the magnetic card even when the magnetic cards are different in thickness. Further, the identification of the coercive force of the magnetic card can be performed with only one insertion operation of the magnetic card

DETAILED DESCRIPTION OF THE PREFERRED EMBODIMENTS

Preferred embodiments according to the present invention will be described with reference to the accompanying drawings.

First Embodiment

Figure 2:
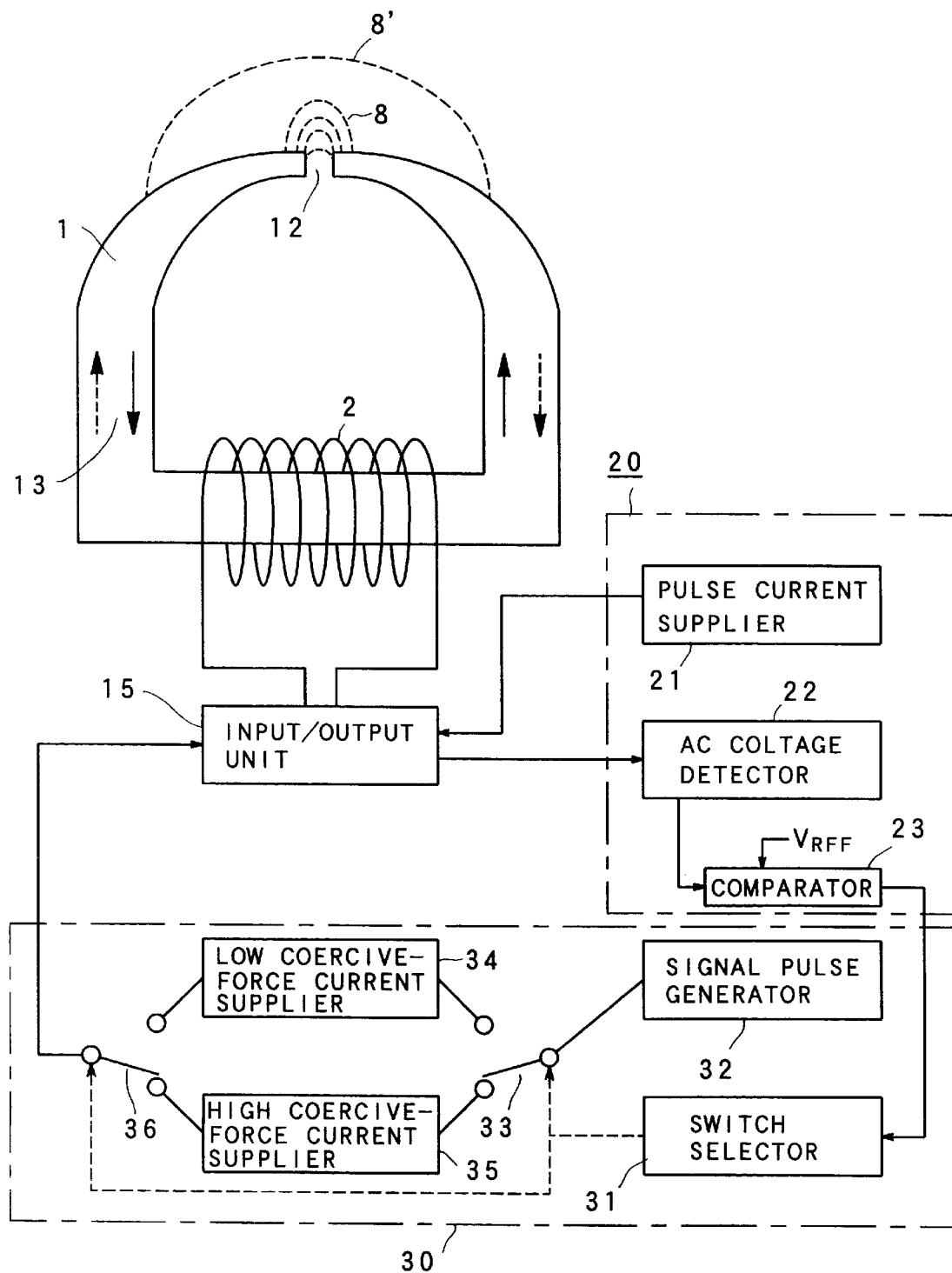
FIG. 2 is a block diagram showing a magnetic card recording/reproducing apparatus according to a first embodiment of the present invention.

FIG. 2 is a block diagram showing the construction of a magnetic card recording/reproducing apparatus according to a first embodiment of the present invention.

Figure 1:
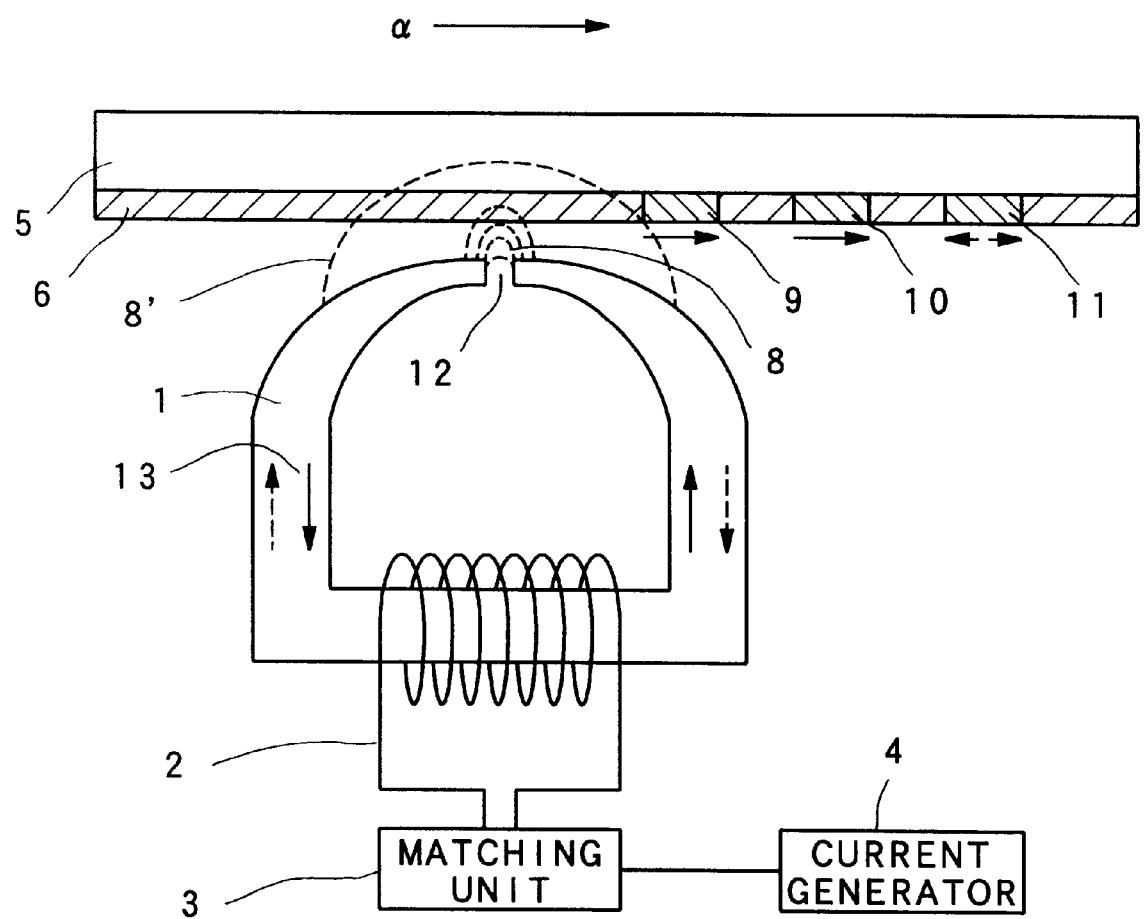
FIG. 1 is a block diagram showing a conventional magnetic card recording/reproducing apparatus.

In FIG. 2, the same elements as the magnetic card recording/reproducing apparatus shown in FIG. 1 are represented by the same reference numerals, and the description thereof is omitted. This embodiment will be described on the assumption that it is applied to a case where magnetic information is recorded in a non-used (new) magnetic card, and it does not directly relate to reproduction of magnetic information. Therefore, the detailed description on the reproduction of the magnetic information is omitted. However, in order to simplify the drawings, it is assumed that a magnetic head is used commonly for recording and reproduction, and a coil 2 of the magnetic head is connected to an input/output unit 15. The input/output unit 15 has a function of supplying exciting current to the coil 2 in a recording operation and also outputting a voltage generated in the coil 2 in reproducing operation.

In this case, the input/output unit 15 is mainly connected to a coercive force identifier 20 and an exciting current selector 30. The coercive force identifier 20 identifies (specifies) the coercive force of a magnetic card, and it comprises a pulse current supply unit 21 for supplying pulse current to the magnetic head at a predetermined period to induce an induction voltage, the peak value of the pulse current varying linearly in accordance with the lapse of the feeding time of the magnetic card, an AC voltage detector 22 for detecting the induction voltage of the magnetic head, and a comparator 23 for identifying the coercive force of the magnetic card on the basis of a time lapse until the output of the AC alternating voltage detector 22 exceeds a predetermined reference value. The exciting current selector 30 selects one of plural predetermined values as exciting current to be applied to the magnetic head, and it comprises a switch selector 31, a signal pulse generator 32, switches 33 and 36, a current supplier 34 for low coercive force, and a current supplier 35 for high coercive force.

Next, the operation of the magnetic card recording/reproducing apparatus as described above will be described.

Figure 3:
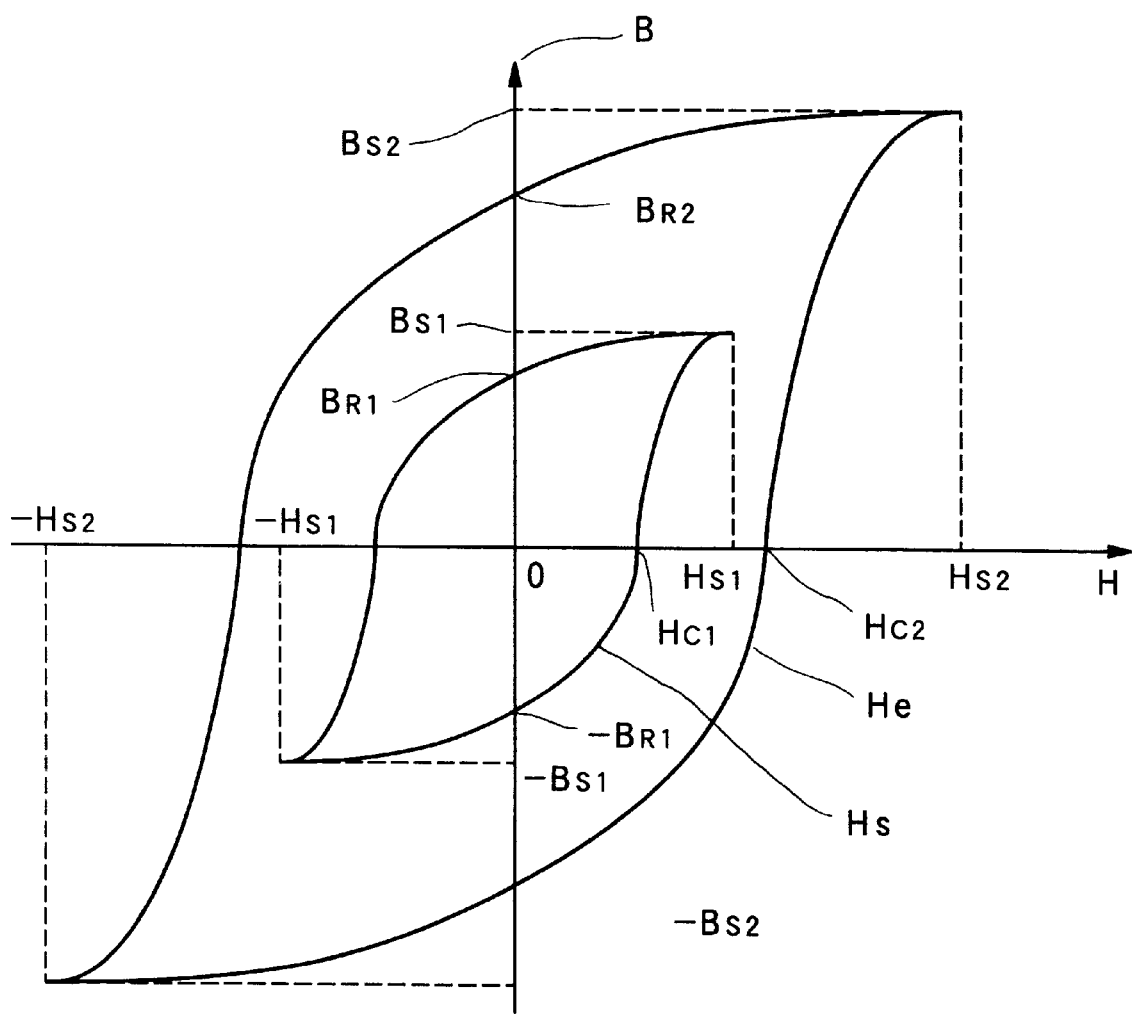
FIG. 3 is a diagram showing B-H (hysteresis) curves to explain the operation of the magnetic card recording/ reproducing apparatus.

It is well known that there are two types of ferromagnetic materials, one material being saturated with small magnetic force while the other material is not saturated unless large magnetic force is applied. The former material shows a hysteresis represented by a small B-H curve and the latter material shows a hysteresis represented by a large B-H curve. FIG. 3 is a graph showing the B-H curves of these representative types of ferromagnetic materials.

In FIG. 3, the B-H curve Hs represents the hysteresis for the ferromagnetic material which is saturated with small magnetic force (hereinafter referred to as "S-type ferromagnetic material"), and the B-H curve Hl represents the hysteresis for the ferromagnetic material which is not saturated with small magnetic force, but is saturated with large magnetic force (hereinafter referred to as "L-type ferromagnetic material"). In this case, the magnetic flux density of the S-type ferromagnetic material is saturated to Bs1 even when magnetic field of Hs1 or more is applied to the ferromagnetic material, and it keeps residual magnetic flux density Br1 when the magnetic field is removed. Further, when magnetic field having the opposite polarity is applied, for example, even when magnetic field of –Hs1 or more is applied, the magnetic flux density of the S-type ferromagnetic material is saturated to –Bs1, and it keeps residual magnetic flux density –Br1 when the magnetic field is removed. Accordingly, when the magnetic field of Hs1 and the magnetic field of –Hs1 are alternately applied to the S-type ferromagnetic material, it shows the hysteresis indicated by the curve Hs in FIG. 3.

In the case of the L-type ferromagnetic material, the same phenomenon appears. That is, even when magnetic field of Hs2 (>Hs1) or more is applied to the L-type ferromagnetic material, the magnetic flux density of the L-type ferromagnetic material is saturated to Br2, and it keeps residual magnetic flux density Br2 (>Br1) when the magnetic field is removed. Further, when magnetic field having the opposite polarity is applied, for example when magnetic field of –Hs2 or more is applied, the magnetic flux density of the L-type ferromagnetic material is saturated to –Bs2, and it keeps residual magnetic flux density –Br2. Accordingly, when the magnetic field of Hs2 and the magnetic field of –Hs2 are alternately applied to the L-type ferromagnetic material, it shows the hysteresis indicated by the curve Hl in FIG. 3.

In general, the point at which the hysteresis traverses the H-axis is called as coercive force. Accordingly, the coercive force of the S-type ferromagnetic material corresponds to the point at which the curve Hs traverses the H-axis and it is represented by Hc1. Likewise, the coercive force of the L-type ferromagnetic material corresponds to the point at which the curve Hl traverses the H-axis and it is represented by Hc2. Accordingly, a magnetic card having a magnetic stripe coated with ferromagnetic material having coercive force of Hc1 is referred to as "low coercive-force magnetic card", and a magnetic card having a magnetic stripe coated with ferromagnetic material having coercive force of Hc2 is referred to as "high coercive-force magnetic card".

Figure 4:
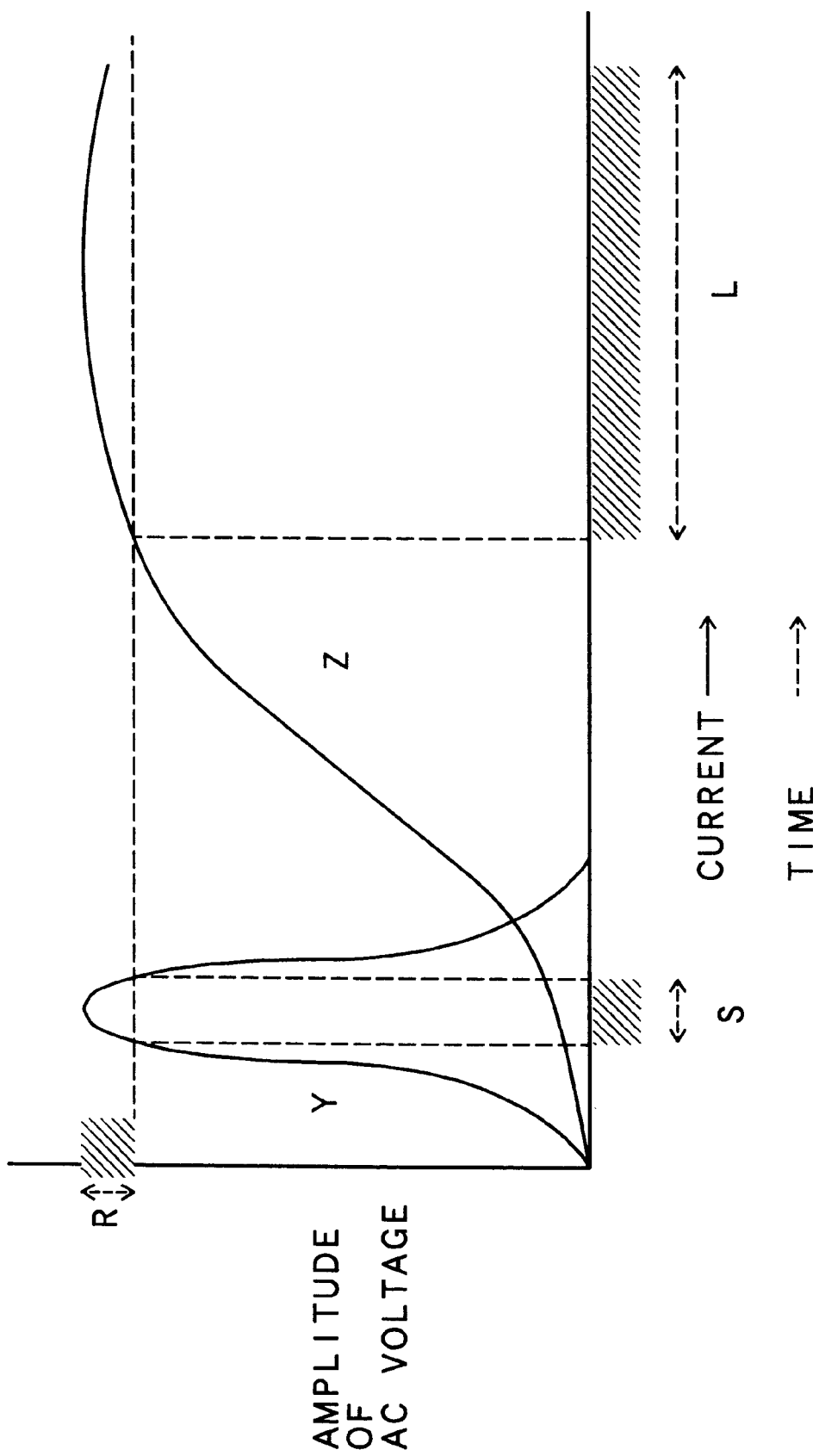
FIG. 4 is a graph showing the relationship between AC voltage and current (time) in recording/reproducing operation.

In order to form the magnetized areas 9, 10 and 11 shown in FIG. 1 (i.e., record magnetic information in the areas 9, 10 and 11 of the magnetic card by applying pulsed magnetic field to each of the above-described two types of magnetic cards, current indicated by an area S shown in FIG. 4 is supplied to the coil 2 for the low coercive-force magnetic card, and current indicated by an area L shown in FIG. 4 is supplied to the coil 2 for the high coercive-force magnetic card to record magnetic information. On the other hand, when these magnetic cards are reproduced, during the feeding of the magnetic cards, the low coercive-force magnetic card induces an AC voltage indicated by a curve Y and the high coercive-force magnetic card induces an AC voltage indicated by a curve Z in FIG. 4 (in this case, the abscissa represents the time axis).

The present invention has been implemented in view of this phenomenon, and the actual coercive force of a magnetic card whose coercive force has been unknown is identified (specified), and the magnetic recording is performed on the basis of the identification result.

Figure 5:
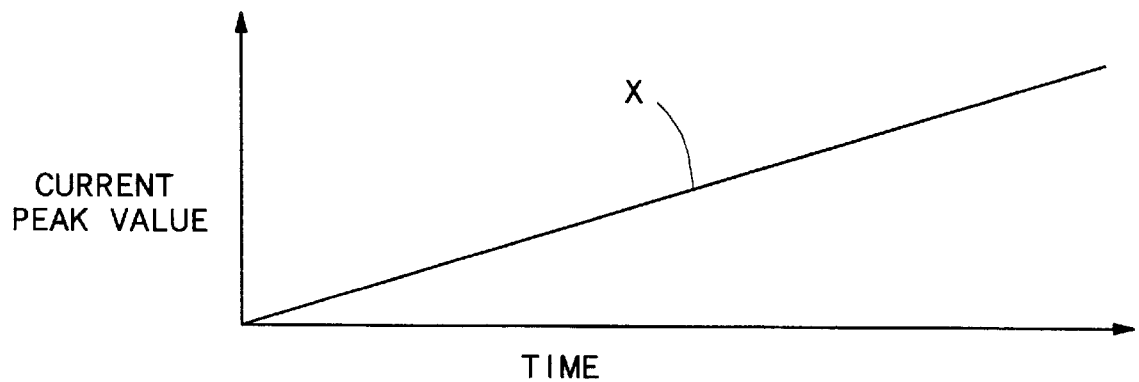
FIG. 5 is a graph showing the relationship between the peak value of current and the time in the recording operation.

According to the magnetic card recording/reproducing apparatus of this embodiment, before data to be recorded are recorded in the magnetic card, the magnetic card is once inserted into the magnetic card recording/reproducing apparatus to identify the coercive force of the magnetic card. At this time, the pulse current supply unit 21 supplies, at a predetermined period, the inserted magnetic card with pulse current whose peak value (X) varies substantially linearly in accordance with the time lapse as shown in FIG. 5, thereby recording magnetic information (information to identify the coercive force of the magnetic card) in the magnetic card. In this case, the residual magnetic flux density of the low coercive-force magnetic card is weak, and the residual magnetic flux density of the high coercive-force magnetic card is strong.

Figure 6:
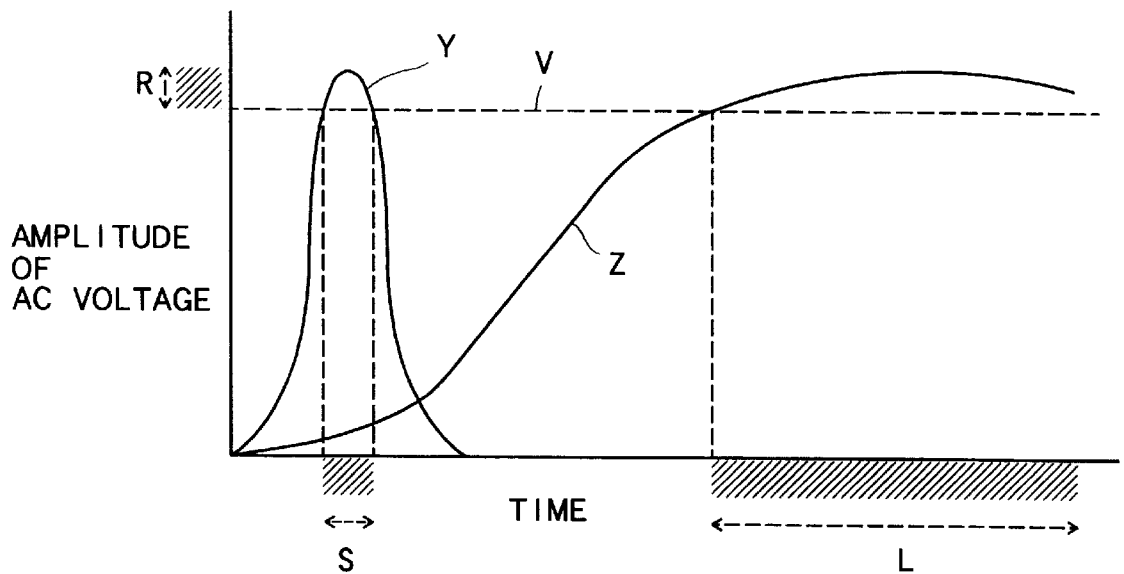
FIG. 6 is a graph showing the relationship between AC voltage and the time in the reproducing operation.

Subsequently, the magnetic card which has been subjected to the above operation is inserted into the magnetic card recording/reproducing apparatus again, and an AC voltage which is induced by the magnetic field generated due to the coercive force of the magnetic card in the input/output portion 15 is detected by the AC voltage detector 22 as shown in FIG. 6. At this time, since the magnetic card is moved, an AC voltage shown in FIG. 6 is detected with the time lapse. That is, the AC voltage indicated by the curve Y is detected for the low coercive-force magnetic card, and the AC voltage indicated by the curve Z is detected for the high coercive-force magnetic card.

At this time, the comparator 23 compares the amplitude of the AC voltage thus detected with a reference value Vref, and identifies the coercive force of the magnetic card on the basis of the time lapse from the time when the AC voltage is detected until the amplitude of the AC voltage exceeds the reference value Vref. Besides, in the case of the low coercive-force magnetic card, the amplitude of the AC voltage has been over the reference value Vref for a period S as shown in FIG. 6. In the case of the high coercive-force magnetic card, the amplitude of the AC voltage has been over the reference value Vref for a period L as shown in FIG. 6. Accordingly, the identification of the coercive force of the magnetic card may be performed not only by detecting the time lapse from the occurrence of the AC voltage, but also by counting the time period for which the amplitude of the AC voltage is over the reference value Vref.

The identification result of the coercive force thus obtained is supplied to the exciting current selector 30. The switch selector 31 constituting the exciting current selector 30 controls the switching operation of the switches 33 and 36 on the basis of the identification result. For example, when the identification result indicates that the magnetic card is a low coercive-force magnetic card, the switch selector 31 controls the switches 33 and 36 to select the low coercive-force current supplier 34, whereby the current supplied from the signal pulse generator 32 is reduced to a small value and supplied to the input/output unit 15. On the other hand, when the identification result indicates that the magnetic card is a high coercive-force magnetic card, the switch selector 31 controls the switches 33 and 36 to select the high coercive-force current supplier 35, whereby the current (large current) supplied from the signal pulse generator is supplied to the input/output unit 15.

Therefore, according to this embodiment, the magnetic recording operation can be performed on any magnetic card having unknown coercive force with an optimum current value.

The switches 33 and 36 of this embodiment are provided as mechanical contact points, however, they may be formed of semiconductor switches or logical switches in place of the mechanical contact points. Further, a part or most of the functions of the elements of the above-described embodiment may be performed by a microcomputer.

Figure 7:
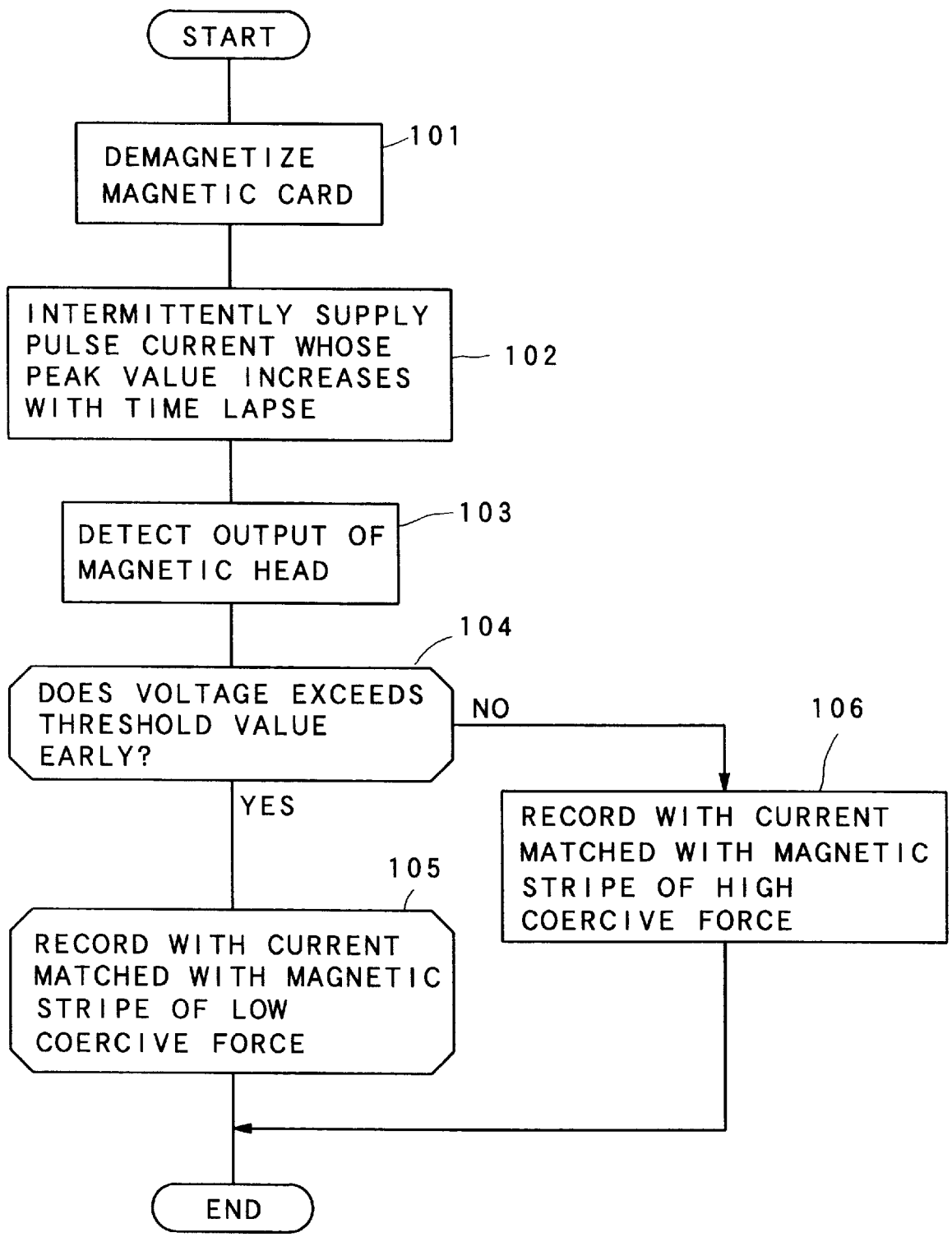
FIG. 7 is a flowchart showing the processing flow when the main functions of the magnetic card recording/ reproducing apparatus of this embodiment are achieved by a microcomputer.
Figure 8:
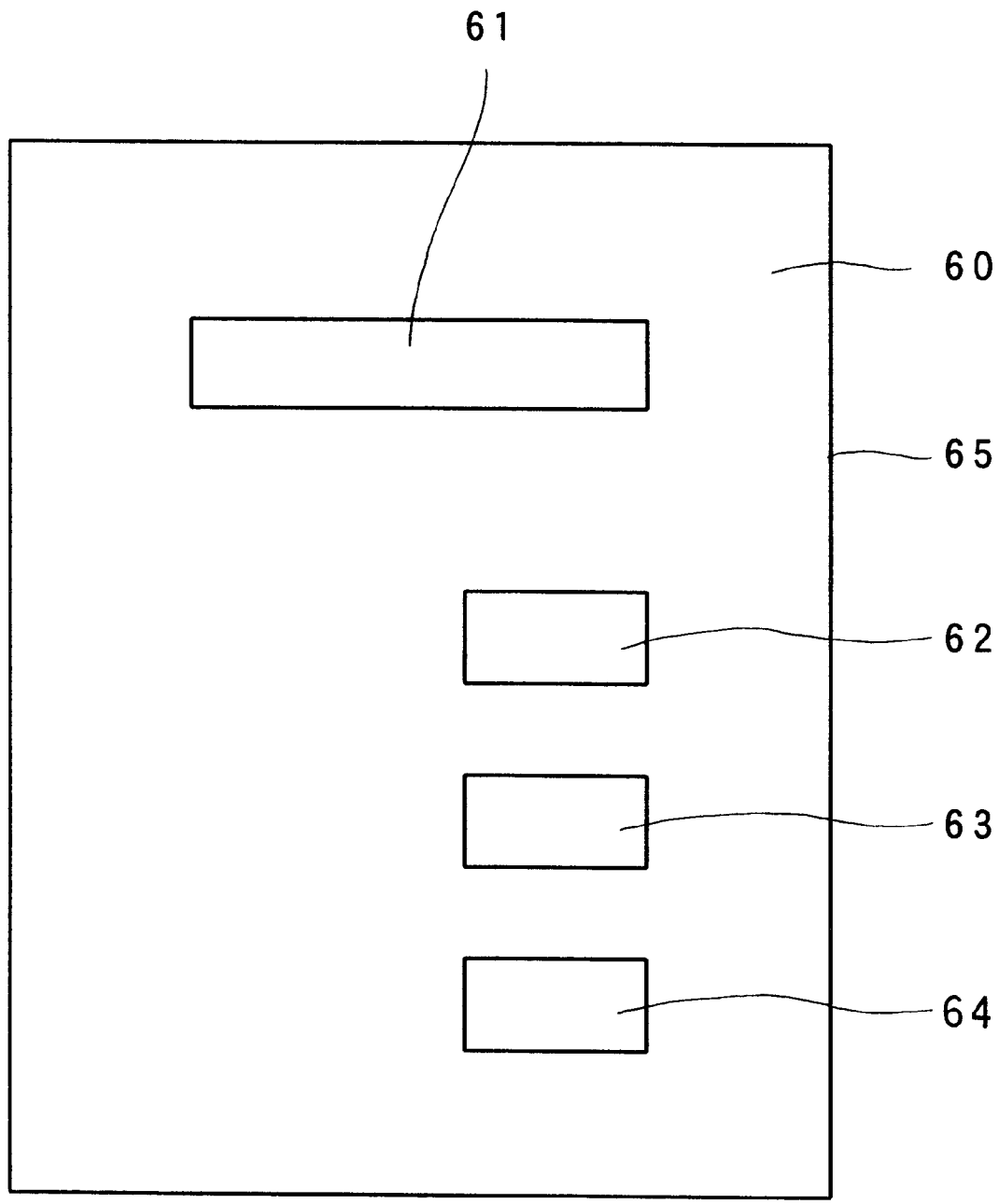
FIG. 8 is a front view of the magnetic card recording/ reproducing apparatus of this embodiment.

FIG. 7 is a flowchart showing the processing flow of the operation of the magnetic card recording/reproducing apparatus according to this embodiment when the functions of the above-described embodiment are performed by a microcomputer.

First, in step 101, a magnetic card is demagnetized in a well-known manner. In a next step 102, the pulse current whose peak value gradually increases with time lapse is supplied to the coil 2 to record the magnetic information for the identification of the coercive force of the magnetic card, and then the magnetic card is removed. Subsequently, the magnetic card is inserted into the magnetic card recording/reproducing apparatus again, and in step 103 the amplitude of the output voltage of the coil 2 of the magnetic head is detected to identify the coercive force of the magnetic card. In step 104, it is judged whether the amplitude of the output voltage exceeds a predetermined reference value Vref. In this case, if the amplitude of the voltage exceeds the reference value early (for example, before a predetermined time period elapses), the magnetic card is identified as a low coercive-force magnetic card, and in step S105 magnetic information is recorded in the magnetic card with the current suitable for the low coercive-force magnetic card. On the other hand, if the amplitude of the voltage does not exceed the reference value early (for example, before a predetermined time period elapses), in step 106 magnetic information is recorded in the magnetic card with the current suitable for the high coercive-force magnetic card. Through the above processing, the same operations as the coercive-force identifier 20 and the exciting current selector 30 shown in FIG. 1 can be performed.

FIG. 7 is a front view showing the outer appearance of the magnetic card recording/reproducing apparatus 60 of the above embodiment.

The magnetic card recording/reproducing apparatus 60 has a case 65. A magnetic card insertion port 61 is provided at the upper portion of the case 65, and a high coercive-force magnetic card switch 62, a low coercive-force magnetic card switch 63 and a full automatic switch 64 are provided in the vertical direction at the lower portion of the case 65. When the coercive force of a magnetic card is known in advance, the high coercive-force magnetic card switch 62 or the low coercive-force magnetic card switch 63 is operated to perform the recording operation. On the other hand, when the coercive force of the magnetic card is unknown or it is difficult to identify the coercive force of the magnetic card, the full automatic switch 64 is operated.

According to this embodiment, there can be provided the magnetic card recording/reproducing apparatus in which magnetic information can be recorded in various magnetic cards having different coercive forces by only one apparatus.

In the above embodiment, it is detected whether the coercive force of the magnetic card is high or low. However, the identification of the coercive force and the recording operation using the optimum current value for magnetic cards having three or more levels of coercive forces may be performed on the basis of the same principle as described above.

Further, not only magnetic cards which are different in coercive force, but also magnetic cards which are different in thickness are put in the market. If magnetic information can be also recorded in the latter magnetic cards by using only one magnetic card recording/reproducing apparatus, there could be provided an apparatus having higher convenience. In order to implement such a magnetic card recording/reproducing apparatus, the magnetic card recording/reproducing apparatus of the above-described embodiment may be provided with a thickness sensor for detecting the thickness of a magnetic card first, and a contact pressure adjustment unit for providing a predetermined pressure to the magnetic head which is brought into contact with the magnetic card. The technique disclosed in Japanese Patent Application No. Hei-9-29675 filed by the inventor of this application may be used as the thickness sensor and the contact pressure adjustment unit.

Further, with the magnetic card recording/reproducing apparatus which can support magnetic cards having different coercive forces, the recording operation can be performed on a magnetic card while selectively enhancing or reducing the intensity of the magnetic field. From this viewpoint, magnetic stripes having different coercive forces may be laminated to obtain a multilayered magnetic card. According to this multilayered magnetic card, when magnetic information is first recorded in the multilayered magnetic card with the strongest magnetic field, and subsequently magnetic information is successively recorded in the multilayered magnetic card while gradually (stepwise) reducing the magnetic field, magnetic information whose amount is several times as large as that of a single-layer magnetic card can be recorded. In addition, the secrecy of the magnetic card can be more enhanced. In this case, if at least one of the magnetic stripes is modulated by using a different frequency, different magnetic signals can be taken out.

Further, in place of the multilayered structure comprising plural magnetic stripes having different coercive forces, magnetic materials having different coercive forces may be mixed with one another and coated on a magnetic stripe of a magnetic card. In this case, magnetic information whose amount is several times as large as that of a single-layer magnetic card can be recorded as in the case of the multilayered magnetic card, and the secrecy can be more enhanced.

As described above, according to the magnetic card recording/reproducing apparatus of the above embodiment, the recording operation can be performed on various magnetic cards having different coercive forces by using only one magnetic card recording/reproducing apparatus. In addition, the identification (specification) of each of the coercive forces of these magnetic cards can be surely performed. Further, the recording operation which is matched with the coercive force of the magnetic card can be surely performed on the magnetic card.

Further, according to the magnetic card recording/reproducing apparatus of the above embodiment, even when magnetic cards are different in thickness, the recording operation can be performed on these magnetic cards by using only one magnetic card recording/reproducing apparatus. In addition, the magnetic card recording/reproducing apparatus of the above embodiment can support increase of information amount and also enhance the secrecy.

In the above embodiment, in order to identify the coercive force of the magnetic card, the magnetic card must be twice inserted into the magnetic card recording/reproducing apparatus. However, in the following embodiment, the magnetic card may be inserted only once into the magnetic card recording/reproducing apparatus to identify the coercive force of the magnetic card.

Second Embodiment

Figure 9:
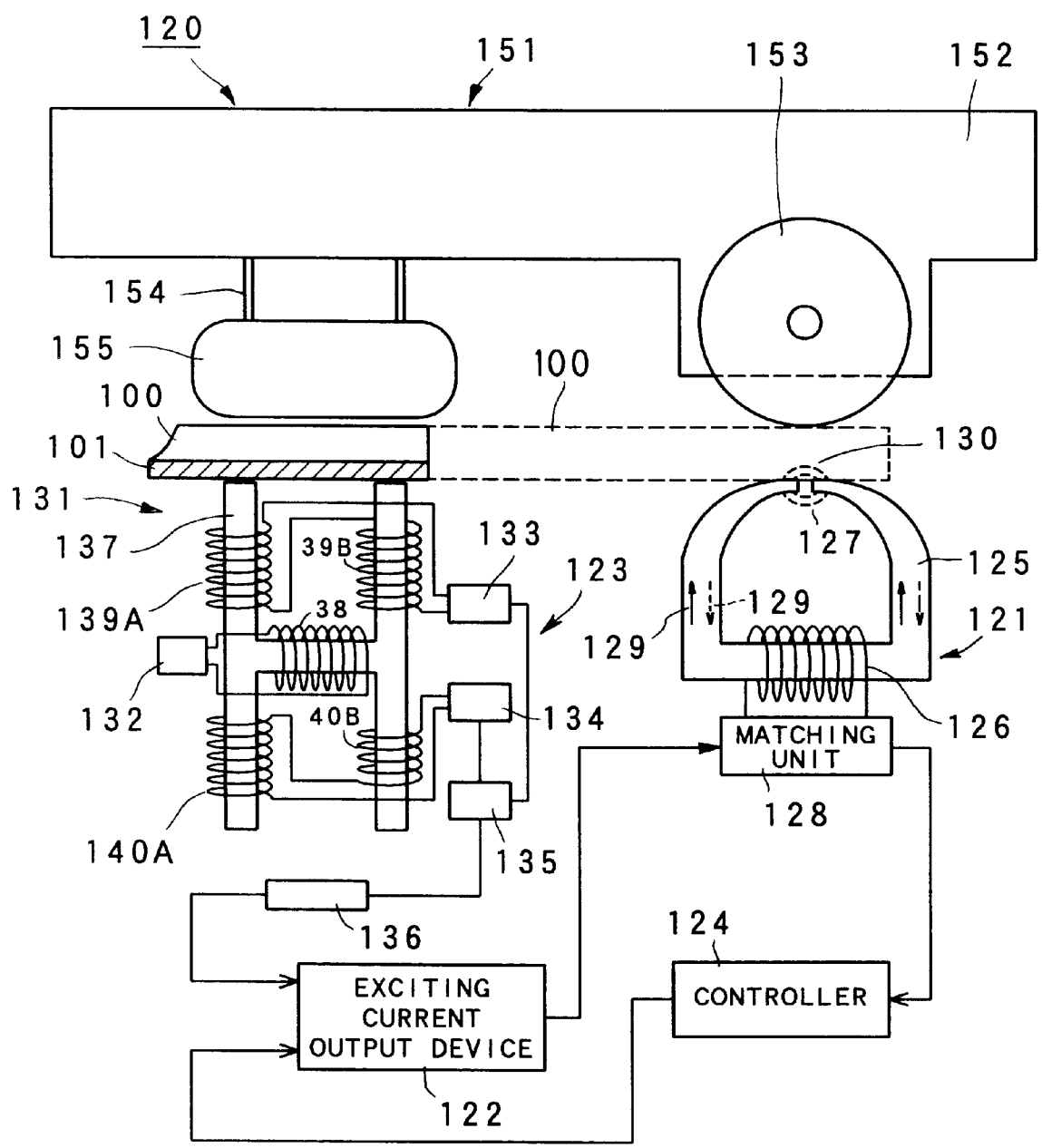
FIG. 9 is a diagram showing a magnetic card recording/reproducing apparatus according to a second embodiment of the present invention.

FIG. 9 is a second embodiment of the magnetic card recording/reproducing apparatus of the present invention.

As shown in FIG. 9, the magnetic card recording/reproducing apparatus 20 records/reproduces magnetic information in/from a magnetic stripe 101 of a magnetic card 100, and it comprises a recording/reproducing magnetic head 121 serving as a recording magnetic head, an exciting current output device 122 serving as exciting current output means, a coercive force identifying device 123 serving as coercive force identifying means, and a controller 124. The controller may be constructed by a special-purpose logical circuit, a computer or the like as in the case of the first embodiment.

Figure 10:
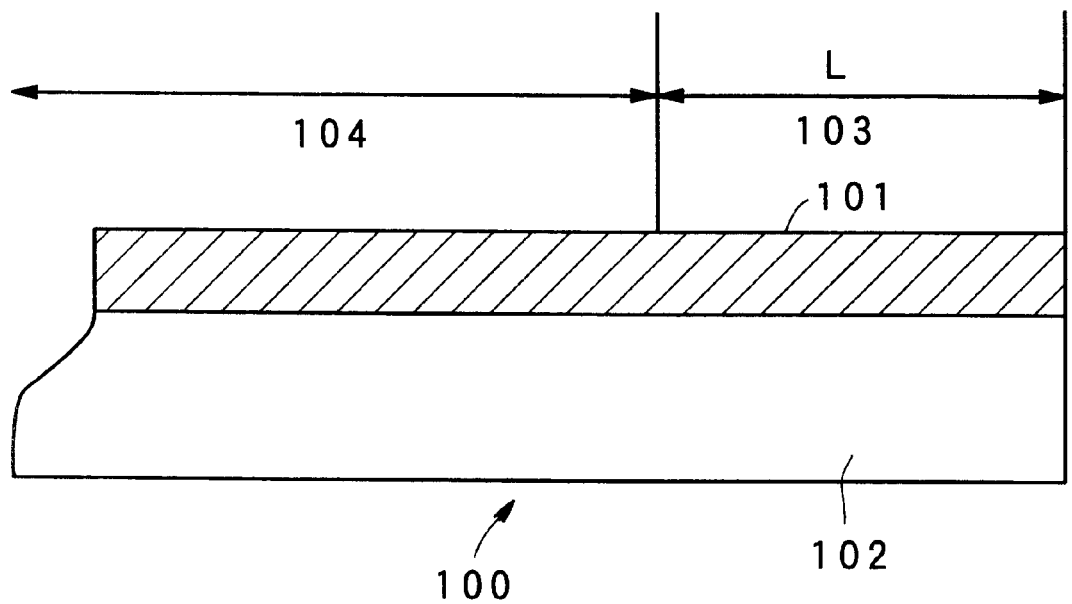
FIG. 10 is a cross-sectional view showing the structure of a magnetic card.

As shown in FIG. 10, the magnetic card 100 comprises a plastic substrate 102 onto which a magnetic stripe 101 is coated, printed or adhesively attached, and the magnetic stripe 101 is formed of magnetic material. When the magnetic card 100 is inserted into a card insertion port of the magnetic card recording/reproducing apparatus 120 and fed at a constant speed, the magnetic stripe 101 is sectioned into a time-counting signal area 103 provided at the end portion of the magnetic stripe 101 in the feeding direction, and a data bit area 104 provided at the other portion of the magnetic stripe 101. Effective magnetic information is recorded in the data bit area 104, and it is not generally recorded in the time-counting signal area 103. A time-counting signal (0) is recorded in the overall time-counting signal area 103, and the time-counting signal area 103 is formed over a distance L (L is equal to about 5 mm) from the end portion of the magnetic stripe 101 in the feeding direction.

The recording/reproducing magnetic head 121 shown in FIG. 9 comprises a substantially ring-shaped core 125 formed of magnetic material, and a coil 126 which is wound around the base portion of the core 125. The core 125 is designed to have a gap 127 of about 20 to 40 $\mu$m.

When magnetic information is recorded on the magnetic card 100 by the recording/reproducing magnetic head 121, the coil 126 is supplied with exciting current from the exciting current output device 122 through a matching unit 128, whereby a magnetic flux 129 occurs in the coil 25. The exciting current from the exciting current output device 122 is an alternating current (AC current) whose polarity (direction) is set every pulse. Accordingly, the direction (polarity) of the magnetic flux 129 occurring in the coil 125 is varied as indicated by a solid-line arrow or a broken-line arrow in FIG. 9, and magnetic field 130 is induced in the gap 127 by the magnetic flux 129 thus formed so as to expand outwardly. At this time, when the magnetic card 100 is fed and approaches to the recording/reproducing magnetic head 121 and then the magnetic stripe 101 of the magnetic card 100 is located to cover the gap 127 of the recording/reproducing magnetic head 121, the magnetic stripe 101 is magnetized in accordance with magnetic poles of the magnetic field 30 and magnetized areas are formed in the magnetic stripe 101 at predetermined intervals, so that magnetic information is recorded in the magnetic card 100.

The matching unit 128 matches the impedance between the coil 126 and the exciting current output device 122, and further shapes pulses supplied from the exciting current output device 122. When magnetic information is reproduced by the recording/reproducing magnetic head 121, the matching unit 128 is disconnected from the exciting current output device 122. When the magnetic card 100 is fed to approach to the core 125 of the recording/reproducing magnetic head 121 and then the magnetic stripe 101 of the magnetic card 100 is moved to cover the gap 127 of the core 125, the magnetic field (lines of magnetic force) leaking from the surface of the magnetic stripe 101 induces current in the coil 26 of the recording/reproducing magnetic head 121. The waveform of the current thus induced is read by the controller 24 to reproduce the magnetic information recorded in the magnetic stripe 101 of the magnetic card 100.

In this embodiment, before the magnetic information is recorded in the magnetic stripe 101 of the magnetic card 100 by the recording/reproducing magnetic head 121 as described above, the coercive force identifying device 123 identifies (specifies) the coercive force of the magnetic stripe 101 of the magnetic card 100. The coercive force identifying device 123 of this embodiment comprises an identifying magnetic head 131, an AC voltage source 132, a main amplifier 133, a sub amplifier 134, a differential amplifier 135 and a coercive force identifier 136 as shown in FIG. 9.

The identifying magnetic head 131 comprises a core 137, a primary coil 138, main secondary coils 139A and 139B, and sub secondary coils 140A and 140B, and the identifying magnetic head 131 is disposed at the upstream side of the recording/reproducing magnetic head 121 in the feeding direction of the magnetic card 100.

Figure 11:
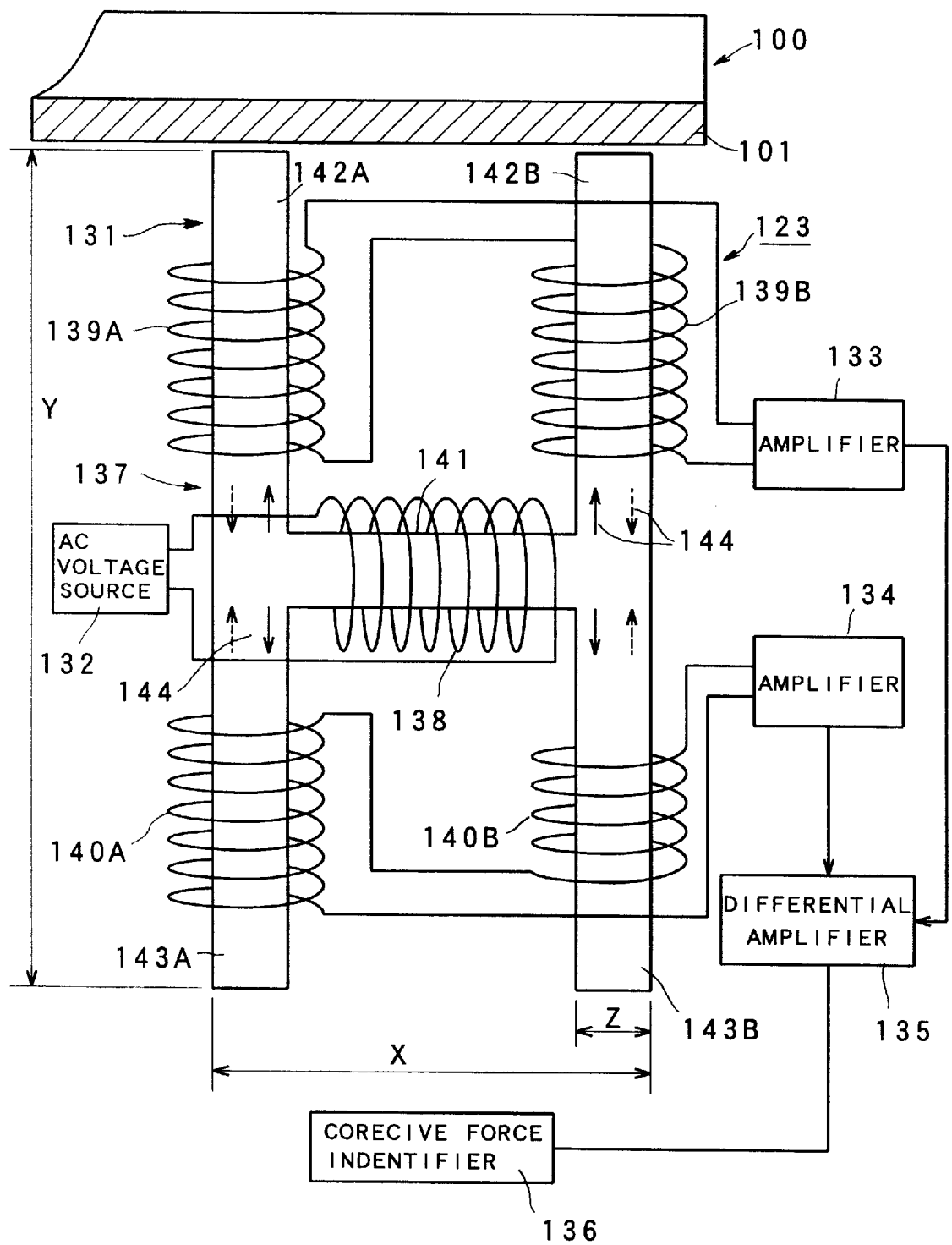
FIG. 11 is a block diagram showing a coercive force identifying device shown in FIG. 9 which contains an enlarged view of a core of the coercive force identifying device.

FIG. 11 is a diagram showing the detailed construction of the coercive force identifying device 123. As shown in FIG. 11, the core 137 comprises an H-shaped core formed of magnetic material, and the primary coil 138 is wound around the center portion 141 of the core 137. The primary coil 138 is connected to the AC voltage source 132, and an AC voltage having a fixed amplitude is applied from the AC voltage source 132 to the primary coil 138. The main secondary coils 139A and 139B are wound around the upper half portions 142A and 142B of the core 137 respectively, and these coils 139A and 139B are connected in series to each other and further connected to the main amplifier 133. Further, the sub secondary coils 140A and 140B are wound around the lower half portions 143A and 143B of the core 137, and these coils 140A and 140B are connected in series to each other and further connected to the sub amplifier 134. The main secondary coils 139A and 139B and the sub secondary coils 140A and 140B are constructed to have the same number of turns.

When the predetermined AC voltage is applied from the AC voltage source 132 to the primary coil 138, magnetic fluxes 44 which mutually directs in the opposite directions occur in the core 137, and variation of the magnetic fluxes induces output voltages (inductive voltages) at the main secondary coils 139A and 139B and the sub secondary coils 140A and 140B. At this time, when the magnetic card 100 is far away from the upper half portions 142A and 142B of the core 137, the magnetic reluctance of the upper half portions 142A and 142B of the core 137 and the magnetic reluctance of the lower half portions 143A and 143B are set to the same value. Therefore, the primary coil 138 generates the same magnetic field between the upper half portions 142A and 142B and between the lower half portions 143A and 143B. The voltage generated in the main secondary coils 139A and 139B is amplified by the main amplifier 133, and the voltage generated in the sub secondary coils 140A and 140B is amplified by the sub amplifier 134. The voltages amplified by the main amplifier 133 and the sub amplifier 134 are supplied to the differential amplifier 135 so that these voltages are offset with each other. When the magnetic card 100 is far away from the upper half portions 142A and 142B of the core 137, the differentially-amplified voltage output from the differential amplifier 35 is set to be equal to zero.

When the magnetic card 100 approaches to the upper half portions 142A and 142B of the core 137 and any position or any range of the time-counting signal area 103 or the data bit area 104 in the magnetic stripe 101 of the magnetic card 100 covers the upper half portions 142A and 142B, the magnetic reluctance of the upper half portions 142A and 142B is reduced to be less than that of the lower half portions 143A and 143B. As a result, the impedance of the main secondary coils 139A and 139B is reduced to be less than that of the sub secondary coils 140A and 140B, and the output voltage generated in the main secondary coils 139A and 139B is larger than the output voltage in the sub secondary coils 140A and 140B, so that the difference between these output voltages is output as the differentially-amplified voltage value from the differential amplifier 135 to the coercive force identifier 136.

Figure 12:
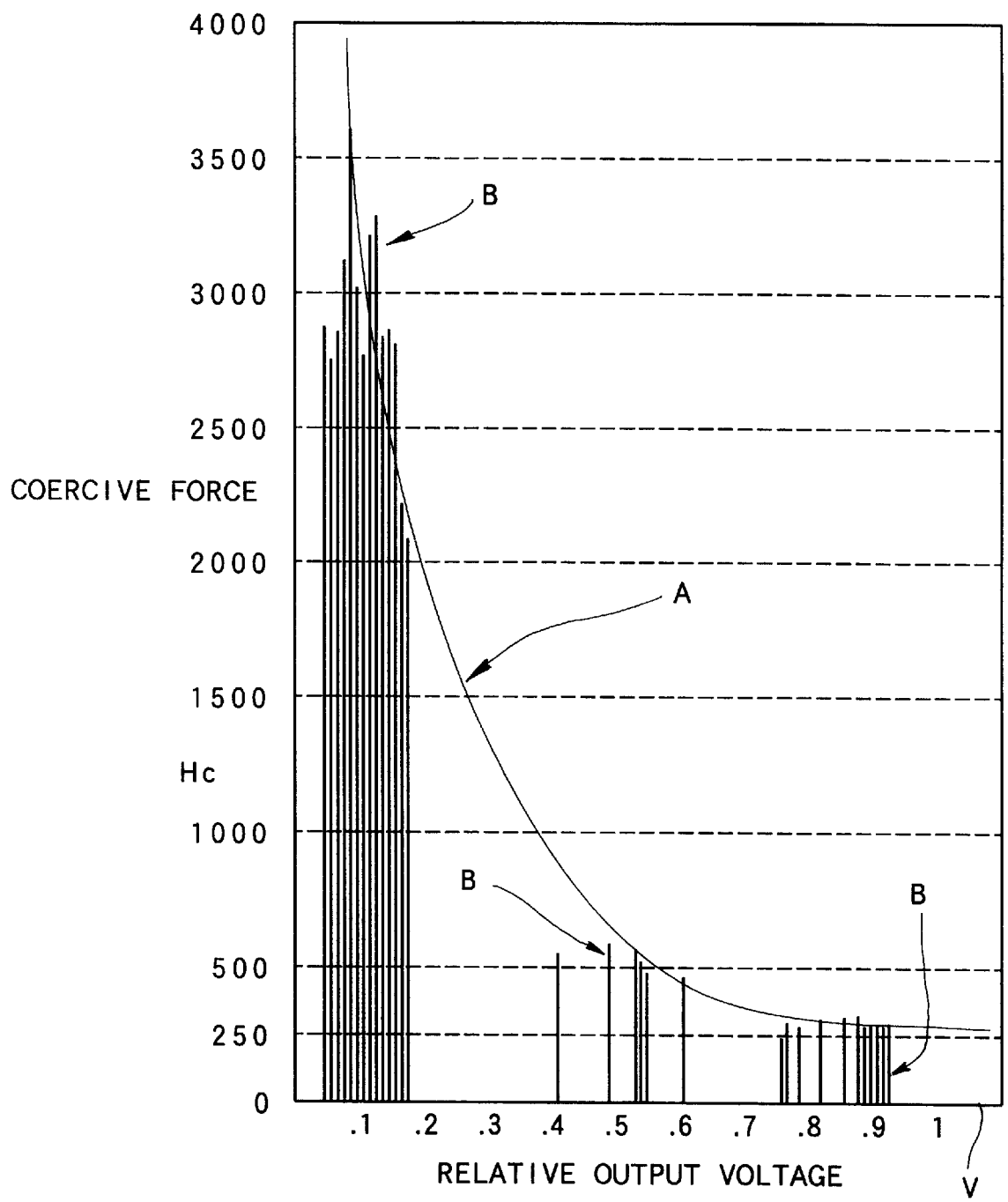
FIG. 12 is a graph showing the relationship between the coercive force of each magnetic card and the relative output voltage which is achieved in advance.

In the coercive force identifier 136 is stored a table representing the relationship between the coercive force and the output voltage of the differential amplifier which was experimentally obtained (specifically, data representing a curved line A in FIG. 12). FIG. 12 is a graph showing the relationship between the coercive force of the magnetic stripe 101 of the magnetic card 100 (oersted unit) (the ordinate of the graph) and the differentially-amplified voltage value of the differential amplifier 35 (the relative output voltage value when 180 mV is set to a unit of 1)(the abscissa of the graph).

Here, bar graphs B in the graph shown in FIG. 12 were obtained as follows. That is, the differentially amplified voltage values were measured for thirty one magnetic cards having magnetic stripes 101 of known coercive forces by using an identifying magnetic head 131 having an H-shaped core 137 in which the lateral width X and the height Y were set to 6 mm and 8 mm respectively and the upper half portions 142A and 142B and the lower half portions 143A and 143B have the same width Z (Z=1.5 mm), and then the relationship between the coercive force of the magnetic stripe 101 of each magnetic card 100 and the relative output voltage calculated from the differentially-amplified voltage values thus measured was obtained as the bar graphs B. One bar graph B corresponds the result for one magnetic card 100.

Here, when the number of magnetic cards 100 to be tested was further increased to obtain bar graphs like the bar graphs B, the relationship between the coercive force of the magnetic stripe 101 of each magnetic card 100 obtained on the basis of the bar graphs B and the relative output voltage value is represented as a continuous curved line A. That is, the curved line A thus obtained is the coercive force data representing the relationship between the coercive force of any magnetic card and the relative output voltage value which is expected to be output from the differential amplifier for the magnetic card concerned. This coercive force data A are beforehand determined and stored in a memory or the like which is provided to the coercive force identifier.

Figure 13:
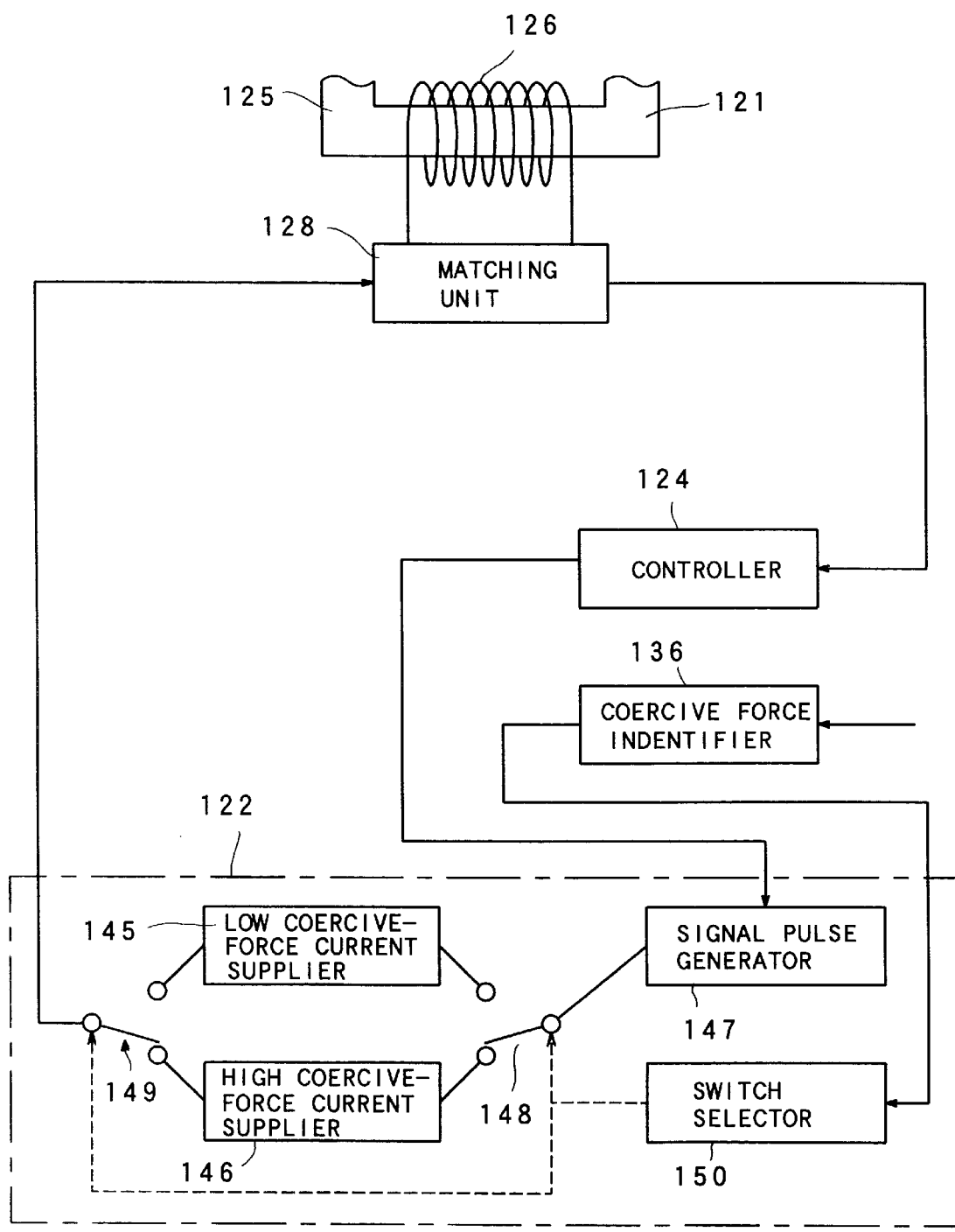
FIG. 13 is a block diagram showing an exciting current supplier shown in FIG. 9.

Accordingly, when the magnetic card is inserted into the magnetic card recording/reproducing apparatus of this embodiment, the coercive force identifier 136 shown in FIGS. 9 and 11 identifies the coercive force of the magnetic card inserted on the basis of the differentially amplified voltage value output from the differential amplifier 135 and the coercive force data (curved line A). The coercive force in the magnetic stripe 101 of the magnetic card 100 is identified as being larger as the differentially amplified voltage value is smaller. The coercive force identified by the coercive force identifier 136 is output to a switch selector 150 of the exciting current output device 122 described later. As shown in FIG. 13, the exciting current output device 122 outputs the exciting current corresponding to the coercive force of the magnetic stripe 101 of the magnetic card 100 to the coil 126 of the recording/reproducing magnetic head 121, and it comprises low coercive-force current supplier 145 and high coercive-force current supplier 146 which serve as current supply means, a signal pulse generator 147, a first switch 148 and a second switch 149, and the switch selector 50 serving as switch selection means.

Each of the low coercive-force current supplier 145 and the high coercive-force current supplier 146 supplies the exciting current (AC current) corresponding to the coercive force of the magnetic stripe 101 of the magnetic card 100. That is, the low coercive-force current supplier 145 supplies the exciting current corresponding to the low coercive force, and the high coercive-force current supplier 146 supplies the exciting current corresponding to the high coercive force. The signal pulse generator 147 generates pulse signals on the basis of an instruction signal from the controller 124.

The first switch 148 selectively supplies the pulse signal output from the signal pulse generator 147 to one of the low coercive-force current supplier 145 and the high coercive-force current supplier 146, and the second switch 149 selectively outputs the exciting current generated in the low coercive-force current supplier 145 or the high coercive-force current supplier 146.

The switch selector 150 controls the switching operation of the first switch 148 and the second switch 149 so that the exciting current which corresponds to the coercive force of the magnetic stripe 101 of the magnetic card 100 and is output from the coercive-force identifier 136 of the coercive force identifying apparatus 123 is output from the exciting current output apparatus 122. Accordingly, the exciting current (the AC current whose direction (polarity) is set every pulse) corresponding to the coercive force of the magnetic stripe 101 of the magnetic card 100 is output to the coil 126 of the recording/reproducing magnetic head 121, and the magnetic information is recorded in the magnetic stripe 101 of he magnetic card 100, that is, the time-counting signal is recorded in the time-counting signal area 103 and the effective magnetic information is recorded in the data bit area 104 by the recording/reproducing magnetic head 121 as described above.

In FIG. 9, a pressure-applying device 151 is disposed at the upper side of the identifying magnetic head 131 and the recording/reproducing magnetic head 121. The pressure-applying device 151 includes a base table 152, a pressure-applying roller 153 which is pivotally mounted in the base table 152, and a pressure-applying pad 155 which is mounted through a spring 154 to the base table 152. The pressure-applying pad 155 presses the magnetic stripe 101 of the magnetic card 100 against the core 137 of the identifying magnetic head 131, and the pressure-applying roller 153 presses the magnetic stripe 101 of the magnetic card 100 against the core 125 of the recording/reproducing magnetic head 121.

Next, the operation of the magnetic card recording/reproducing apparatus 120 when magnetic information is recorded in the magnetic stripe 101 of the magnetic card 100 will be described.

When the magnetic card 100 is inserted into a card insertion port (not shown) of the magnetic card recording/reproducing apparatus 120, the magnetic card 100 is successively fed at a constant speed to the upper side of the coercive identifying device 123 and the recording/reproducing magnetic head 121. When the magnetic card 100 is inserted into the card insertion-port and the leading edge of the magnetic card 100 in the feeding direction is detected by a card sensor (for example, photosensor), the coercive force identifying device 123 is actuated. At this time, the magnetic card 100 is far away from the identifying magnetic head 131, and thus the differential amplifier 135 of the coercive force identifying device 123 measures and stores therein the differentially amplified voltage value of zero in the state that the magnetic card 100 is far away from the identifying magnetic head 131.

Thereafter, when the magnetic card 100 approaches to the identifying magnetic head 131, the magnetic reluctance between the upper half portions 142A and 142B of the core 137 is reduced and thus the impedance of the main secondary coils 139A and 139B is reduced, so that the accurate position of the magnetic card 100 can be detected. Further, at the time when the magnetic stripe 101 of the magnetic card 100 perfectly covers the upper half portions 142A and 142B of the core 137, the differential amplifier 135 measures and stores the differentially amplified voltage value at that time. Subsequently, the coercive force identifier 136 of the coercive force identifying device 123 calculates the relative output voltage value on the basis of the differentially amplified voltage value measured in the differential amplifier 135, and identifies the coercive force of the magnetic stripe 101 of the magnetic card on the basis of the curved line A of FIG. 12.

Thereafter, the exciting current output device 122 actuates the switch selector 50 on the basis of the identification result of the coercive force identifying device 123, and outputs to the recording/reproducing magnetic head 121 the exciting current corresponding to the coercive force of the magnetic card 100 which is identified by the coercive force identifying device 123. The recording/reproducing magnetic head 121 records the effective magnetic information in the data bit area 104 of the magnetic stripe 101 of the magnetic card 100 and also records the time-counting signal in the time-counting signal area 103.

Accordingly, according to the magnetic card recording/reproducing apparatus 120 of the second embodiment, before the magnetic information is recorded in the magnetic stripe 101 of the magnetic card 100, the coercive force of the magnetic stripe 101 of the magnetic card 100 is identified by the coercive force identifying device 123, and the exciting current corresponding to the coercive force thus identified is supplied from the exciting current output device 122 to the recording/reproducing magnetic head 121 to record the magnetic information in the magnetic stripe 101 of the magnetic card 100, so that the coercive force is identified for various magnetic cards 100 having different coercive forces every time the recording operation is performed, and thus the magnetic information can be recorded in the various magnetic cards by using only one recording/reproducing magnetic head 121.

Third Embodiment

Figure 14:
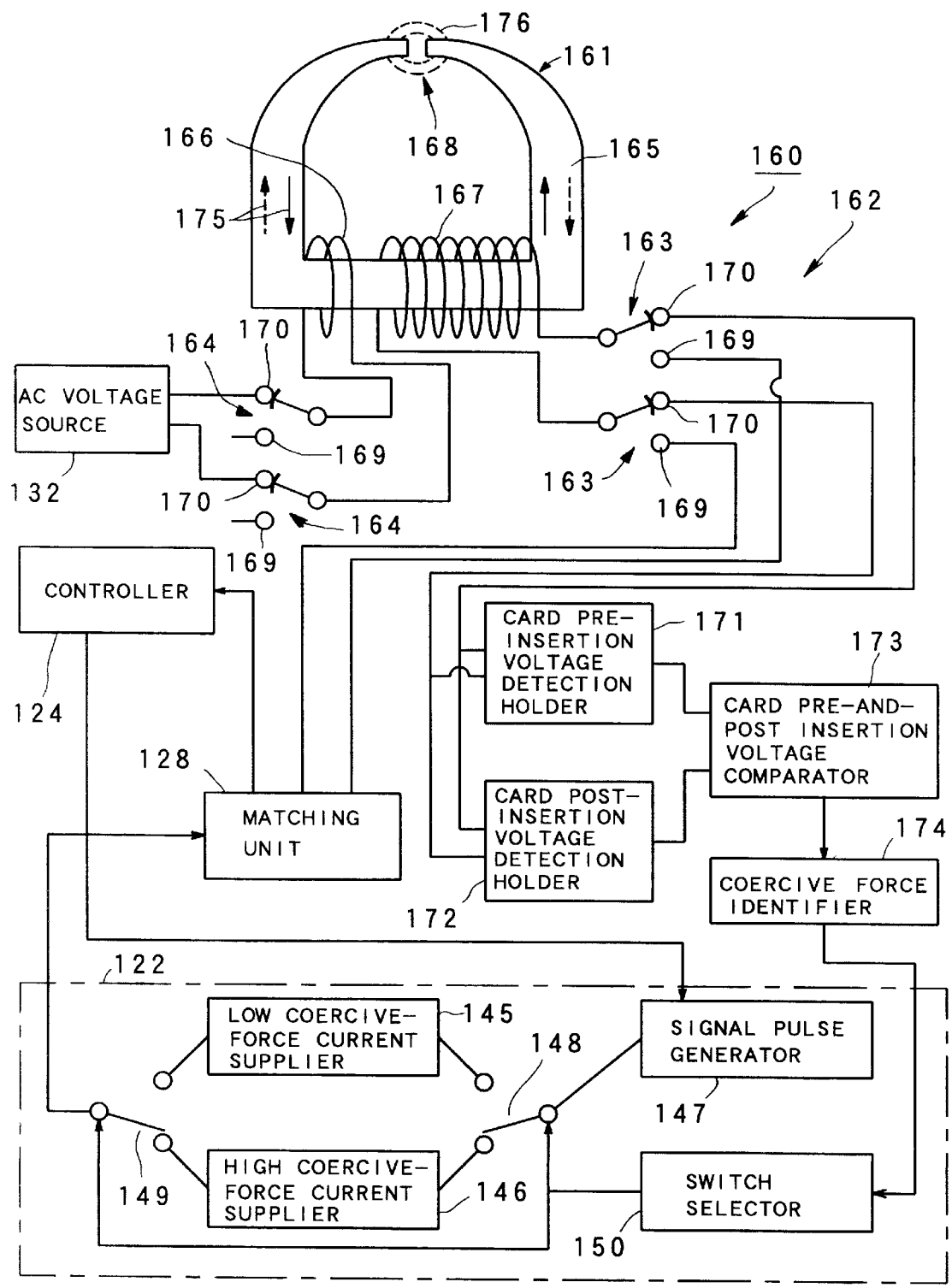
FIG. 14 is a block diagram showing a magnetic card recording/reproducing apparatus according to a third embodiment of the present invention.

FIG. 14 is a block diagram showing a third embodiment of the magnetic card recording/reproducing apparatus. In the third embodiment, the same elements as the second embodiment are represented by the same reference numerals, and the description thereof is omitted.

A magnetic card recording/reproducing apparatus 160 of the third embodiment includes a magnetic head 161, a coercive force identifying device 162 serving as coercive force identifying means, an exciting current output device 122, and a controller 124. The magnetic head 161 functions as both of a recording/reproducing magnetic head and an identifying magnetic head, and a first change-over switch 163 and a second change-over switch 164 are used to switch the function of the magnetic head 161 to one of the recording/reproducing magnetic head and the identifying magnetic head.

The magnetic head 161 includes a substantially ring-shaped ring core 165 formed of magnetic material, and a primary coil 166 and a secondary coil 167 which are wound around the base portion of the core 165 and independent of each other, and the core 165 is designed to have a gap 168 of about 20 to 40 μm.

When the first change-over switch 163 and the second change-over switch 164 which are operated interlockingly with each other are switched to the lower contact points 169 respectively, the magnetic head 61 functions as the recording/reproducing magnetic head. At this time, as in the case of the recording/reproducing magnetic head 121, the secondary coil 167 of the magnetic head 161 is supplied with the exciting current from the exciting current output device 122 through the matching unit 128 in the recording operation of magnetic information to record the magnetic information in the magnetic stripe 101 of the magnetic card 100 which covers the gap 168 of the core 165. Further, in the reproducing operation of magnetic information, the magnetic head 161 converts the magnetic field (the lines of magnetic force) from the magnetic stripe 101 of the magnetic card 100 covering the gap 168 of the core 165 to the corresponding current through the coil 167. The waveform of this current is read through the matching unit 128 by the controller 24 to reproduce the magnetic information recorded in the magnetic card 100.

When the first change-over switch 163 and the second change-over switch 164 are switched to the upper contact points 170, the magnetic head 161 functions as the identifying magnetic head. The coercive force identifying device 162 includes the magnetic head 161 functioning as the identifying magnetic head, an AC voltage source 132, a card pre-insertion voltage detection holder 171, a card post-insertion voltage detection holder 172, a card pre-and-post-insertion voltage comparator 173, and a coercive force identifier 174.

An AC voltage having a fixed amplitude is applied from the AC voltage source 132 through the upper contact points 170 to the primary coil 166 to generate the magnetic fluxes 175 directing in the opposite directions in the core 165, whereby the magnetic field 176 (lines of magnetic force) are formed in the gap 168 so as to extend outwardly.

Variation of the magnetic flux 175 generated in the coil 165 induces the output voltage in the secondary coil 167. When the magnetic card is far away from the magnetic head 161, the magnetic reluctance of the magnetic head 161 is large, and thus the impedance of the secondary coil 167 is large. Therefore, the output voltage of the secondary coil 167 is reduced in accordance with the increase of the impedance of the secondary coil 167. The value of the output voltage is detected and stored through the upper contact points 170 by a card pre-insertion voltage detection holder 171. On the other hand, when the magnetic card 100 approaches to the magnetic head 161 and any position or range of the time-counting signal area 103 or the data bit area 104 of the magnetic stripe 101 of the magnetic card 100 is located so as to cover the gap 168 of the magnetic head 161, the magnetic reluctance of the magnetic head 161 is reduced, and thus the impedance of the secondary coil 167 is reduced. Therefore, the output voltage of the secondary coil 167 is increased and the value of the output voltage is detected and stored through the upper contact points 170 by a card post-insertion voltage detection holder 172.

The card post-insertion voltage detection holder 172 may be designed to have only the detection function and have no storage (holding) function.

The card pre-and-post insertion voltage comparator 173 compares the output voltages which are detected and stored by the card pre-insertion detection holder 171 and the card post-insertion voltage detection holder 172, thereby calculating the output voltage difference, and outputs the output voltage difference to a coercive force identifier 174. In the coercive force identifier 174 is stored data representing a curve (not shown) between the coercive force of the magnetic stripe 101 of the magnetic card 100 and the relative value of the output voltage difference (relative output voltage value), which is similar to the data stored in the coercive force identifier 136 of the above embodiment. The coercive force identifier 174 calculates the relative output voltage from the output voltage value calculated by the card pre-and-post insertion voltage comparator 173, and identifies the coercive force of the magnetic stripe 101 of the magnetic card 100 on the basis of the curve stored.

The coercive force which is identified by the coercive force identifier 174 is identified as being higher as the output voltage value calculated in the card pre-and-post insertion comparator 173 is smaller. The identification result of the coercive force identifier 174 is output to the switch selector 150 of the exciting current output device 122, and after the first change-over switch 163 and the second change-over switch 164 are switched from the upper contact points 170 to the lower contact points 169, the exciting current corresponding to the coercive force of the magnetic stripe 101 of the magnetic card 100 is output from the exciting current output device 122 through the matching unit 128 and the lower contact point 69 to the magnetic head 161 functioning as the recording/reproducing magnetic head, whereby the magnetic information is recorded in the magnetic stripe 101 of the magnetic card 100 by the magnetic head 161, that is, the time signal is recorded in the time-counting signal area 103 and the effective magnetic information are recorded in the data bit area 104.

Next, the operation of the magnetic card recording/reproducing apparatus 160 when the magnetic information is recorded in the magnetic stripe 101 of the magnetic card 100 will be described.

When the magnetic card 100 is inserted into the card insertion port (not shown) of the magnetic card recording/reproducing apparatus 160, the magnetic card 100 is fed inwardly at a fixed speed. At the time when the magnetic card 100 is inserted into the card insertion port, a card sensor (for example, an optical sensor, not shown) detects the leading edge position of the magnetic card 100 in the feeding direction. At the time when the card sensor detects the leading edge position of the magnetic card 100, the magnetic card recording/reproducing apparatus 160 is actuated if necessary, and at the same time the first change-over switch 163 and the second change-over switch 164 are switched to the upper contact points 170 to actuate the coercive force identifying device 162 so that the magnetic head 161 acts as the coercive force identifying magnetic head.

The gap 168 of the magnetic head 161 is set to 20 to 40 μm, and thus the length which is needed for the magnetic stripe 101 of the magnetic card 100 to sufficiently cover the gap 168 may be set to several hundreds μm. The coercive force identifying device 162 identifies the coercive force of the magnetic stripe 101 while any position or range of the time-counting signal area 103 (distance≈5 mm) or data bit area 104 of the magnetic stripe 101 of the magnetic stripe 100.

That is, when the magnetic card 100 is far away from the magnetic head 161 at the time when the coercive force identifying device 162 is actuated, the coercive force identifying device 162 makes the card pre-insertion voltage detection holder 171 detect and store the output voltage occurring in the secondary coil 167. Subsequently, the coercive force identifying device 162 actuates the card post-insertion voltage detection holder 172 at the time when the magnetic card 100 approaches to the magnetic card 161 and the magnetic stripe 101 of the magnetic card 100 covers the gap 168 of the magnetic head 161, and at that time it makes the card post-insertion voltage detection holder 172 detect and store the output voltage occurring in the secondary coil 167. In the coercive force identifying device 162, the card pre-and-post insertion voltage comparator 173 calculates the difference of the output voltages detected by the card pre-insertion voltage detection holder 171 and the card post-insertion voltage detection holder 172, and the coercive force identifier 174 identifies the coercive force of the magnetic stripe 101 of the magnetic card 100 on the basis of the output voltage difference.

The exciting current output device 122 actuates the switch selector 150 in accordance with the coercive force of the magnetic stripe 101 of the magnetic card 100 which is identified by the coercive force identifier 174 of the coercive force identifying device 162, whereby the exciting current corresponding to the coercive force thus detected is allowed to be output.

Thereafter, the magnetic card recording/reproducing device 160 switches the first change-over switch 163 and the second change-over switch 164 to the lower contact points 169 to make the magnetic head 161 act as the recording/reproducing magnetic head and supply the exciting current from the exciting current output device 122 to the magnetic head 161, whereby the effective magnetic information is recorded in the data bit area 104 of the magnetic stripe 101 of the magnetic card 100 and the time-counting signal is recorded in the time-counting signal area 103.

Accordingly, in the magnetic card recording/reproducing device 160 of this embodiment, before the magnetic information is recorded in the magnetic stripe 101 of the magnetic card 100, the coercive force of the magnetic stripe 101 of the magnetic card 100 is identified by the coercive force identifying device 162, and the exciting current corresponding to the coercive force thus identified is output from the exciting current output device 122 to the magnetic head 161 functioning as the recording magnetic head, thereby recording the magnetic information in the magnetic stripe 101 of the magnetic card 100. Therefore, the coercive force can be identified every recording operation for various magnetic cards 100 having magnetic stripes 101 which are different in coercive force, an the magnetic information can be recorded by using the magnetic head 161 serving as a single recording magnetic head.

Further, the magnetic card recording/reproducing apparatus is simplified in construction by using a single magnetic head for the magnetic card identification and the recording/reproducing operation, and thus the magnetic card recording/reproducing apparatus 160 can be constructed in a compact size and in low cost.

Fourth Embodiment

Figure 15:
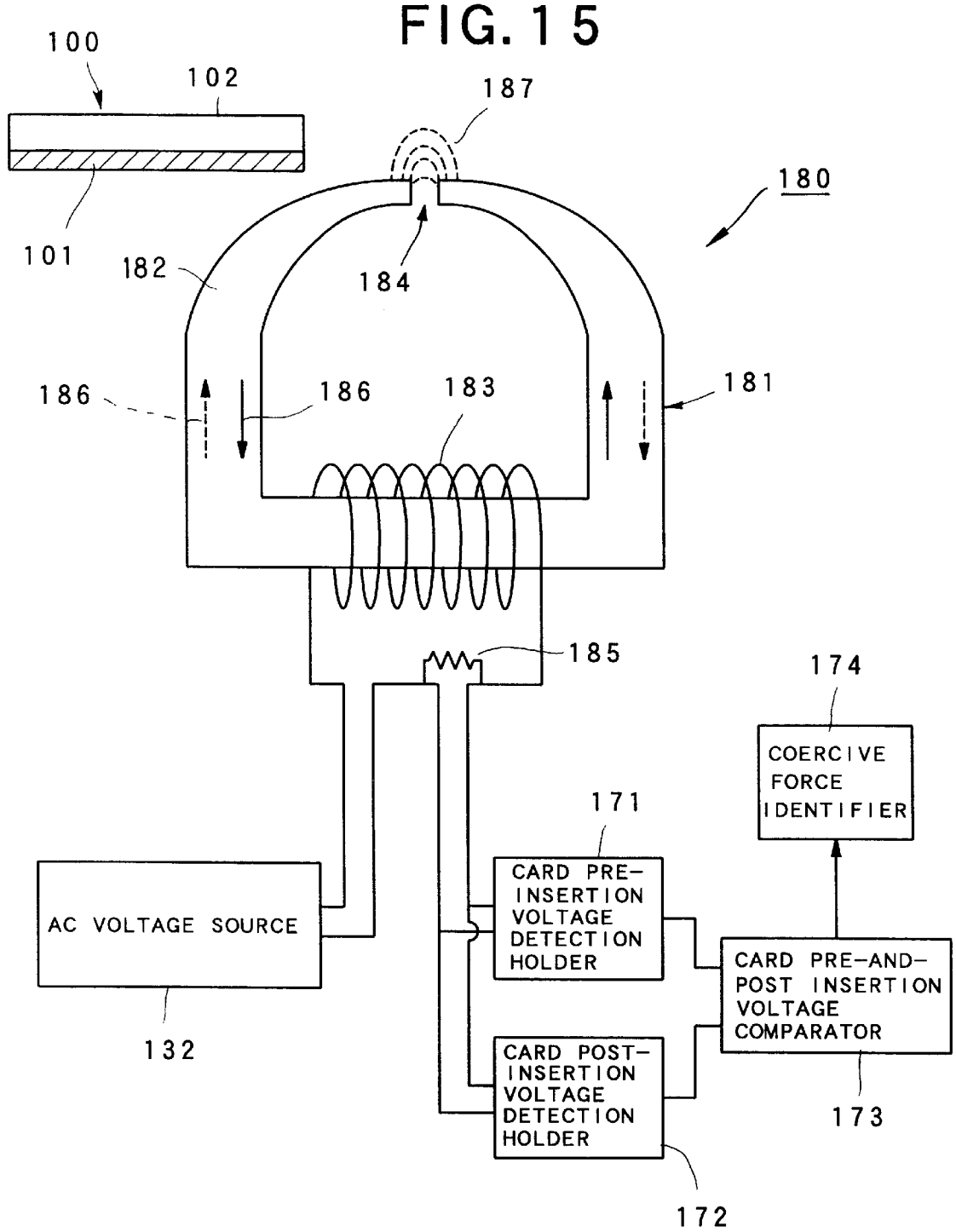
FIG. 15 is a block diagram showing a coercive force identifying device of a fourth embodiment of the magnetic card recording/reproducing apparatus according to the present invention.

FIG. 15 is a block diagram showing a coercive force identifying device according to a third embodiment of the magnetic card recording/reproducing apparatus of the present invention. In the fourth embodiment, the same elements as the third embodiment are represented by the same reference numerals, and the description thereof is omitted.

A coercive force identifying device 180 includes an identifying magnetic head 181, an AC voltage source 132, a card pre-insertion voltage detection holder 171, a card post-insertion voltage detection holder 172, a card pre-and-post insertion voltage comparator 173, and a coercive force identifier 174. The identifying magnetic head 181 may be provided separately from the recording/reproducing magnetic head 121 as in the case of the identifying magnetic head 131 of the second embodiment, or it may be also used as the recording/reproducing magnetic head as in the case of the magnetic head 161 of the third embodiment.

The identifying magnetic head 181 includes a substantially ring-shaped core 182 formed of magnetic material, and a coil 183 wound around the base portion of the core 182. The core 182 has a gap 184 of about 20 to 40 μm. An AC voltage having a fixed amplitude is applied from the AC voltage source 132 to the coil 183, whereby the current corresponding to the impedance of the coil 183 and a resistor 185 flows in the coil 183, and the magnetic fluxes 186 directing in the opposite directions are generated in the core 182 due to variation of the current. The magnetic fluxes 186 induce magnetic field 187 (lines of magnetic force) in the gap 184 of the core 182, and the variation of the magnetic fluxes 186 induces an output voltage in the coil 183.

The output voltage of the coil 183 is detected and stored as the voltage value between the resistor 185 by the card pre-insertion voltage detection holder 171 and the card post-insertion voltage detection holder 172. The card pre-insertion voltage detection holder 171 detects and stores the output voltage when the magnetic card 100 is far away from the identifying magnetic head 181, so that the magnetic reluctance of the core 182 is increased and thus the impedance of the coil 183 is large. When the magnetic card 100 approached to the identifying magnetic head 181 and any position or range of the time-counting signal area 103 or data bit area 104 of the magnetic stripe 101 of the magnetic card 100 covers the gap 184 of the core 182, so that the magnetic reluctance of the core 182 is reduced and the impedance of the coil 183 is reduced. Therefore, the card post-insertion voltage detection holder 72 detects and stores the increased output voltage.

The coercive force identifying device 80 identifies the coercive force of the magnetic stripe 101 of the magnetic card 100 on the basis of the output voltages of the coil 183 detected by the card pre-insertion voltage detection holder 171 and the card post-insertion voltage detection holder 172 by using the card pre-and-post insertion voltage comparator 173 and the coercive force identifier 174. The coercive force identified by the coercive force identifying device 180 is output to the exciting current output device 122, and the magnetic information is recorded in the magnetic stripe 101 of the magnetic card 100 by the exciting current corresponding to the coercive force, that is, the time-counting time and the effective magnetic information are recorded in the time-counting signal area 103 and the data bit area 104, respectively.

Accordingly, the magnetic card recording/reproducing apparatus using the coercive force identifying device 180 according to the fourth embodiment can also achieve the same effect as the magnetic card recording/reproducing devices 120 and 160 of the second and third embodiments of the present invention.

Fifth Embodiment

Figure 16:
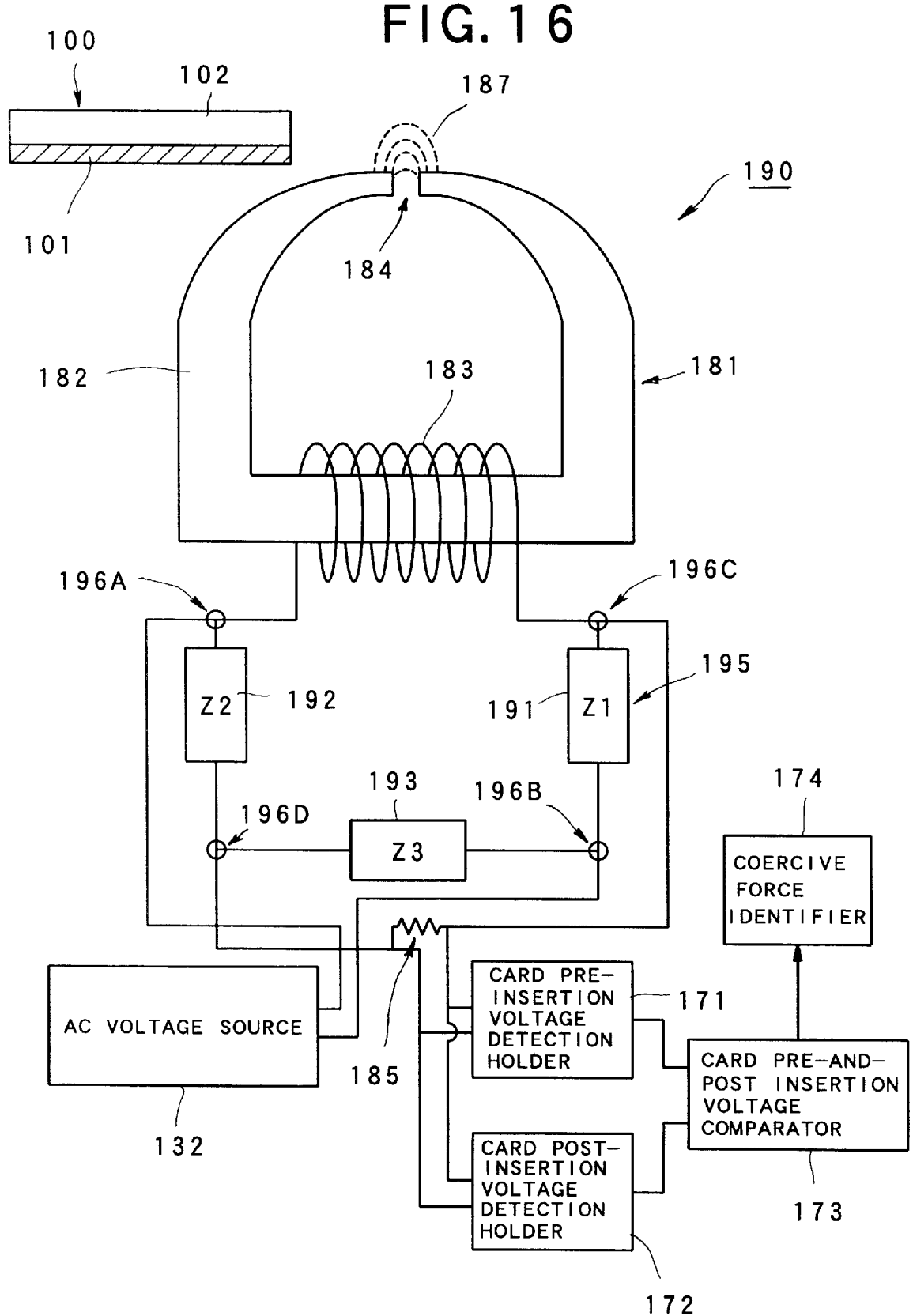
FIG. 16 is a block diagram showing a coercive force identifying device of a fifth embodiment of the magnetic card recording/reproducing apparatus of the present invention.

FIG. 16 is a block diagram showing a fourth embodiment of the magnetic card recording/reproducing apparatus according to the present invention. In the fourth embodiment, the same elements as the fourth embodiment are represented by the same reference numerals, and the description thereof is omitted.

In a coercive force identifying device 190 of this embodiment, the identifying magnetic head 181 constitutes an AC bridge 195 together with a first resistor 191, a second resistor 192 and a third resistor 193. An AC voltage having a fixed amplitude is applied from the AC voltage source 132 to an A point 196A and a B point 196B of the AC bridge 195. Further, the voltage between a C point 196C and a D point 196D of the AC bridge 195 is detected and stored by the card pre-insertion voltage detection holder 171 or the card post-insertion voltage detection holder 172.

In the AC bridge 195 thus constructed, the first resistor 191 and the third resistor 193 are designed to have the same impedance, and the second resistor 192 is designed to have the same impedance as the coil 183 when the magnetic card 100 is far away from the identifying magnetic head 181. Accordingly, when the magnetic card 100 is far away from the identifying magnetic head 181, the potential difference between the C point 196C and the D point 196D is equal to zero, and no current flows in the resistor 185. At this time, the card pre-insertion voltage detection holder 171 detects and stores the potential difference (i.e., zero V) applied across both the ends of the resistor 185.

When the magnetic card 100 approaches to the identifying magnetic head 181 and any position or range of the time-counting signal area 103 or the data bit area 104 of the magnetic stripe 101 of the magnetic card 100 covers the gap 184 of the identifying magnetic head 181, the magnetic reluctance of the core 182 is reduced and the impedance of the coil 183 is also reduced, so that the potential at the C point 196C becomes higher than that at the D point 196D to thereby destruct the current balance of the AC bridge 95, and current flows in the resistor 185. Therefore, the card post-insertion voltage detection holder 172 detects and stores the potential difference across both the ends of the resistor 185.

The card pre-and-post insertion comparator 173 calculates the potential difference detected by the card pre-insertion voltage detection holder 171 and the card post-insertion voltage detection holder 172, that is, the voltage value which increases from zero, and identifies the coercive force of the magnetic stripe 101 of the magnetic card 100 on the basis of the calculated voltage value. The coercive force is higher as the calculation voltage value thus calculated in the coercive force identifier 174 is smaller.

Accordingly, in the magnetic card recording/reproducing apparatus using the coercive force identifying device 190 described above, the same effect as the magnetic card recording/reproducing devices 120 and 160 can be achieved, and also the detection sensitivity based on the card pre-insertion voltage detection holder 171 and the card post-insertion voltage detection holder 172 is enhanced, so that the coercive force of the magnetic card 100 can be identified with high precision.

Sixth Embodiment

Figure 17:
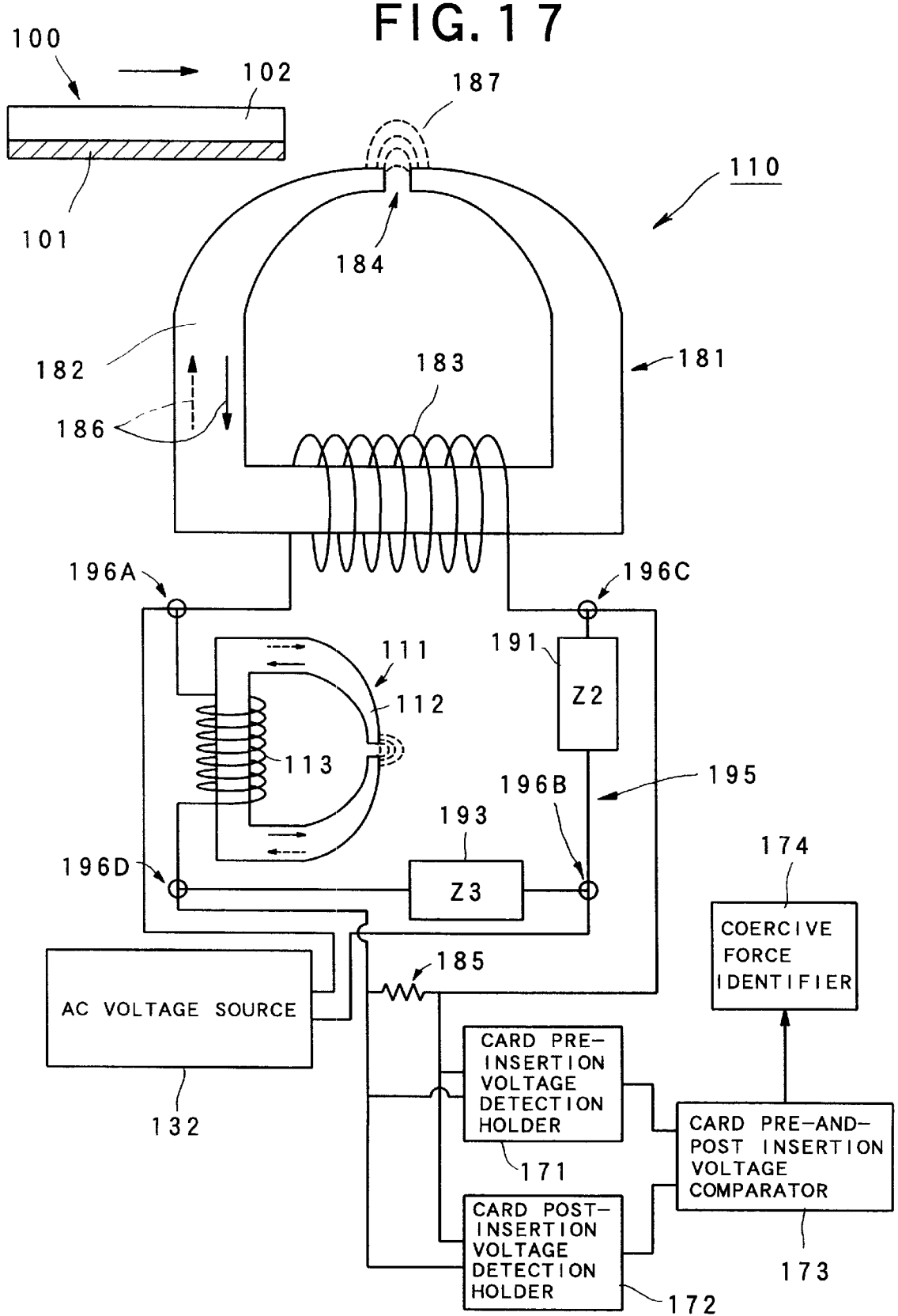
FIG. 17 is a block diagram showing a coercive force identifying device of a sixth embodiment of the magnetic card recording/reproducing device according to the present invention.

FIG. 17 is a block diagram showing a coercive force identifying device according to a sixth embodiment of the magnetic card recording/reproducing apparatus of the present invention. In the sixth embodiment, the same elements as the fourth and fifth embodiments are represented by the same reference numerals, and the description thereof is omitted.

A coercive force identifying device 110 is designed so that in the coercive force identifying device 190 as described above the second resistor 192 is replaced by another magnetic head 111 which is designed in the same structure as the identifying magnetic head 181 and provided with a core 112 and a coil 113. The impedance of the coil 183 of the identifying magnetic head 181 is a complex impedance which is affected not only by the coil 183, but also by the core 182, and it is very difficult to manufacture the resistor which is the same level as this complex impedance. However, by using the magnetic head 111 having the same construction as the identifying magnetic head 181, the same impedance as the identifying magnetic head 181 can be easily achieved. Therefore, in the magnetic card recording/reproducing apparatus of this embodiment, the second resistor 192 is replaced by the magnetic head 111.

The impedance of the magnetic head 111 is set to be equal to the impedance of the coil 183 when the magnetic card 100 is far away from the identifying magnetic head 181. Therefore, when the magnetic card 100 is far away from the identifying magnetic head 181, the potential difference between the C point 196C and the D point 196D is equal to zero, and no current flows in the resistor 185. At this time, the card pre-insertion voltage detection holder 171 detects and stores the potential difference of zero across both the ends of the resistor 185.

When the magnetic card 100 approaches to the identifying magnetic head 181 and any position or range of the time-counting signal area 103 or the data bit area 104 of the magnetic stripe 101 of the magnetic card 100 covers the gap 184 of the identifying magnetic head 181, the magnetic reluctance of the core 182 is reduced and the impedance of the coil 183 is also reduced. Therefore, the potential at the C point 196 is higher than that at the D point 196D, and the card post-insertion voltage detection holder 172 detects and stores the potential difference across both the ends of the resistor 185. The card pre-and-post insertion voltage comparator 173 compares the potential difference detected by the card pre-insertion voltage detection holder 171 and the card post-insertion voltage detection holder 172 to calculate the increased voltage, and further the coercive force identifier 174 identifies the coercive force of the magnetic stripe 110 of the magnetic card 100 on the basis of the increased voltage from the card pre-and-post voltage comparator 173.

Accordingly, in the above-described magnetic card recording/reproducing apparatus using the magnetic stripe 101, the same effect as the magnetic card recording/reproducing devices 120 and 160 can be achieved, and also the detection sensitivity based on the card pre-insertion voltage detection holder 171 and the card post-insertion voltage detection holder 171 can be more enhanced as compared with the coercive force identifying device 190, so that the coercive force of the magnetic card 100 can be identified with higher precision.

The present invention is not limited to the above embodiments, and various modifications may be made to the above embodiments.

In the second and third embodiments, the mechanical contact points are used for the first switch 148 and the second switch 149 of the exciting current output device 122 and the first change-over switch 163 and the second change-over switch 164 of the magnetic card recording/reproducing apparatus 160, however, semiconductor switches or logical switches may be used for these switches.

Further, in the first to sixth embodiments, when the feeding speed of the magnetic card is higher than the operation time of the coercive force identifying devices 20, 123, 162, 180, 190 and 110 or the exciting current output device 122 (the exciting current selector 30), it may be adopted that the feeding operation of the magnetic card is temporarily stopped, and in this state the coercive force of the magnetic stripe of the magnetic card is identified by the coercive force identifying devices 20, 123, 162, 180, 190 and 110 and the exciting current is selected by the exciting current output device 122 (the exciting current selector 30).

Further, in the second to sixth embodiments, the coercive force identifying devices 20, 123, 162, 180, 190 and 110 may identify the coercive force of the magnetic stripe of the magnetic card at the first insertion time when the magnetic card 100 is first inserted into the card insertion port of the apparatus, and the exciting current output device 122 (the exciting current selector 30) may output the exciting current corresponding to the coercive force thus identified at the second insertion time when the magnetic card is inserted secondly, whereby the magnetic information is recorded in the magnetic stripe of the magnetic card by the recording/reproducing magnetic head.

Further, the number of the current suppliers of the exciting current selector 30 (the number of the current suppliers of the exciting current output device 122) is not limited to two (i.e., the low coercive-force current supplier 34 (low coercive-force current supplier 145) and the high coercive-force current supplier 35 (the high coercive-force current supplier 146), and it may be set to three or more. Accordingly, one of plural current suppliers may be selected by the switch selector 31 (150) to supply continuously-varying exciting current to the recording/reproducing magnetic head so that the recording operation can be performed on plural magnetic cards having different coercive forces with the optimum exciting current to the magnetic card Further, the coil 167 of the coercive force of the identifying device 162 of the third embodiment may be constructed as an AC bridge by using resistors and another magnetic head as in the case of the fifth and sixth embodiments, whereby the coercive force of the magnetic card 100 can be identified with higher precision.

Still further, in the second to sixth embodiment, the recording/reproducing magnetic head 121 may be a special-purpose magnetic head, and the magnetic head 161, 181 may function both as a coercive-force identifying magnetic head and as a magnetic head which is specially used for recording.

As described above, according to the magnetic card recording/reproducing apparatus of the present invention, before magnetic information is recorded in a magnetic card, the coercive force identifying means detects the variation of the magnetic reluctance of the identifying magnetic head to identify the coercive force of the magnetic card, and the exciting current corresponding to the coercive force thus identified is output from the exciting current output means to the recording magnetic head to record the magnetic information in the magnetic card. Therefore, the magnetic information can be recorded in various magnetic cards having different coercive forces by using a single recording magnetic head.

What is claimed is:

1. The magnetic card recording/reproducing apparatus for recording/reproducing magnetic information in a magnetic card, comprising:
   a coercive force identifier for identifying the coercive force of the magnetic card before magnetic information is recorded in the magnetic card; and
   an exciting current supplier for selecting one of plural predetermined exciting current values as exciting current to be supplied to a recording magnetic head for recording the magnetic information in the magnetic card on the basis of the identification result of said coercive force identifier so that the magnetic information will be recorded in the magnetic card with the exciting current thus selected by a reproducing magnetic head for reproducing the magnetic information from the magnetic card.

2. The magnetic card recording/reproducing apparatus as claimed in claim 1, wherein said coercive force identifier includes: a pulse current supplier for supplying said recording magnetic head with pulse current at a predetermined period to record predetermined magnetic information for identifying the coercive force of the magnetic card, the pulse current being set to have a peak value which varies substantially linearly in accordance with the time lapse of feeding of the magnetic card; an AC voltage detector for detecting an inductive voltage which is induced in accordance with the predetermined magnetic information recorded in the magnetic card in the reproducing magnetic head; and a comparator for identifying the coercive force of the magnetic card on the basis of a judgment as to whether the output of said AC voltage detector exceeds a predetermined reference value more early than a predetermined time.

3. The magnetic card recording/reproducing apparatus as claimed in claim 2, wherein the peak value of the pulse current is set to increase substantially linearly in accordance with the time lapse of the feeding of the magnetic card.

4. The magnetic card recording/reproducing apparatus as claimed in claim 3, wherein the predetermined magnetic information to identify the coercive force of the magnetic card is recorded in the magnetic card in a first insertion operation of the magnetic card by said pulse current supplier, and then the detection of the inductive voltage by said AC voltage detector and the identification of the coercive force of the magnetic card by said comparator are performed in a second insertion operation of the magnetic card.

5. The magnetic card recording/reproducing apparatus as claimed in claim 1, wherein said exciting current supplier includes at least two recording current suppliers to supply one of at least two exciting current values which are different in amplitude, and a switching unit for selecting one of said at least two recording current suppliers through a switching operation thereof.

6. The magnetic card recording/reproducing apparatus as claimed in claim 1, further including a thickness sensor for detecting the thickness of the magnetic card, and a contact-pressure adjustment unit for adjusting, in accordance with the thickness of the magnetic card detected by said thickness sensor, the pressure to be applied to the recording magnetic head and the reproducing magnetic head which are brought into contact with the magnetic card.

7. The magnetic card recording/reproducing apparatus as claimed in claim 1, wherein the magnetic card has plural magnetic stripes which are respectively coated with magnetic materials having different coercive forces and adhesively attached to one another in a laminate structure.

8. The magnetic card recording/reproducing apparatus as claimed in claim 1, wherein the magnetic card has a magnetic stripe coated with plural magnetic materials which are mixed with one another and different in coercive force.

9. The magnetic card recording/reproducing apparatus as claimed in claim 1, wherein a single magnetic head is commonly used as both the recording magnetic head and the reproducing magnetic head.

10. The magnetic card recording/reproducing apparatus as claimed in claim 1, wherein said coercive force identifier further includes an identifying magnetic head to which an AC voltage having a fixed amplitude is applied, and identifies the coercive force of the magnetic card by detecting variation of the magnetic reluctance of said identifying magnetic head which occurs when the magnetic card is fed so as to be far away from or approach to said identifying magnetic head.

11. The magnetic card recording/reproducing apparatus as claimed in claim 10, wherein said coercive force identifier is disposed at the upstream side of said recording magnetic head in the feeding direction of the magnetic card.

12. The magnetic card recording/reproducing apparatus as claimed in claim 10, wherein said identifying magnetic head includes: an H-shaped core formed of magnetic material; a primary coil which is wound around the center portion of said core to which an AC voltage having a fixed amplitude is applied by an AC voltage source; and first and second secondary coils which are wound around both the side portions of said core with respect to the center portions of said core, so that the same magnetic reluctance is set to the surrounding portions of said core, and wherein said coercive force identifier compares variation of the magnetic reluctance of the surrounding portions of said first secondary coil occurring when the magnetic card is fed far away from or approaches to said first secondary coil with the magnetic reluctance of the surrounding portions of said second secondary coil, thereby identifying the coercive force of the magnetic card.

13. The magnetic card recording/reproducing apparatus as claimed in claim 10, wherein said coercive force identifier further includes a differential amplifier for differentially amplifying an output voltage induced in said first secondary coil and an output voltage induced in said second secondary coil, and identifies the coercive force of the magnetic card on the basis of the difference between a differentially-amplified voltage value of said differential amplifier when the magnetic card is far away from said first secondary coil and a differentially-amplified voltage value of said differential amplifier when the magnetic card approaches to said first secondary coil.

14. The magnetic card recording/reproducing apparatus as claimed in claim 13, wherein the differentially-amplified voltage value of said first secondary coil when the magnetic card is far away from said first secondary coil is set to zero.

15. The magnetic card recording/reproducing apparatus as claimed in claim 10, wherein a single magnetic head is commonly used for both said identifying magnetic head and said recording magnetic head.

16. The magnetic card recording/reproducing apparatus as claimed in claim 10, wherein said identifying magnetic head of said coercive force identifier has a coil comprising a primary coil and a secondary coil which are independent of each other, and wherein said coercive force identifier further includes: an AC voltage source connected to said primary coil to apply an AC voltage having a fixed amplitude to said primary coil; a card pre-insertion voltage detector which is connected to said secondary coil and serves to detect and hold an inductive voltage which is induced in said secondary coil dependently on the magnetic reluctance of the surrounding portion of said secondary coil when the magnetic card is far away from said identifying magnetic head; and a card post-insertion voltage detector which is connected to said secondary coil and serves to detect and hold an inductive voltage which is induced in said secondary coil dependently on the magnetic reluctance of the surrounding portion of said secondary coil when the magnetic card approaches to said identifying magnetic head, said coercive force identifier identifying the coercive force of the magnetic card on the basis of the difference between the output voltage of said card pre-insertion voltage detector and the output voltage of said card post-insertion voltage detector.

17. The magnetic card recording/reproducing apparatus as claimed in claim 16, wherein said coil of said identifying magnetic head of said coercive force identifier constitutes a bridge together with plural resistors, and said AC voltage source is connected to said bridge and said card pre-insertion voltage detection holder and said card post-insertion voltage detection holder are connected to said bridge in parallel.

18. The magnetic card recording/reproducing apparatus as claimed in claim 10, wherein said identifying magnetic head of said coercive force identifier has a coil, and said coercive force identifier further includes: an AC voltage source connected to said coil to apply an AC voltage having a fixed amplitude to said coil; a card pre-insertion voltage detector for detecting and holding an inductive voltage which is induced in said secondary coil dependently on the magnetic reluctance of the surrounding portion of said coil when the magnetic card is far away from said identifying magnetic head; and a card post-insertion voltage for detecting and holding an inductive voltage which is induced in said coil dependently on the magnetic reluctance of the surrounding portion of said coil when the magnetic card approaches to said identifying magnetic head, said card pre-insertion voltage detection holder and said card post-insertion voltage detection holder being connected to said coil in parallel, and wherein said coercive force identifier identifies the coercive force of the magnetic card on the basis of the difference between the output voltage of said card pre-insertion voltage detector and the output voltage of said card post-insertion voltage detector.

19. The magnetic card recording/reproducing apparatus as claimed in claim 18, wherein said coil of said identifying magnetic head of said coercive force identifier constitutes a bridge together with plural resistors, and said AC voltage source is connected to said bridge and said card pre-insertion voltage detection holder and said card post-insertion voltage detection holder are connected to said bridge in parallel.

20. The magnetic card recording/reproducing apparatus as claim 17, wherein one of said plural resistors is another magnetic head which is designed in the same construction as said identifying magnetic head.

21. The magnetic card recording/reproducing apparatus as claimed in claim 10, wherein said exciting current supplier includes a switch selector which performs a switching operation in accordance with the identification result of said coercive force identifier, and a current supplier which can supply, in accordance with the switching operation of said switch selector, said recording magnetic head with one of exciting current values which are different in amplitude, whereby the exciting current which is matched with the coercive force of the magnetic card is supplied to said recording magnetic head.

22. The magnetic card recording/reproducing apparatus as claimed in claim 21, wherein said current supplier of said exciting current supplier includes at least two recording current suppliers to supply one of at least two exciting current values which are different in amplitude, and said switch selector selects one of said at least two recording current suppliers through the switching operation thereof.

23. The magnetic card recording/reproducing apparatus as claimed in claim 1, wherein the magnetic card is provided with a time-counting signal area at the end portion thereof in the feeding direction, and a data bit area at the other portion, and wherein said coercive force identifying means identifies the coercive force of the magnetic card in the time-counting signal area or the data bit area and said exciting current supplier outputs the exciting current corresponding to the coercive force of the magnetic card thus identified, whereby said recording magnetic head records magnetic information in the time-counting area or the data bit area.

24. The magnetic card recording/reproducing apparatus as claimed in claim 1, wherein said coercive force identifier identifies the coercive force of the magnetic card in a first insertion operation of the magnetic card, and said exciting current supplier supplies the exciting current corresponding to the coercive force thus identified in a second insertion operation of the magnetic card to record the magnetic information in the magnetic card by said recording magnetic head.

25. A magnetic card recording/reproducing method for recording/reproducing magnetic information in a magnetic card, comprising the steps of:

identifying the coercive force of the magnetic card before magnetic information is recorded in the magnetic card; and selecting one of plural predetermined exciting current values as exciting current to be supplied to a recording magnetic head for recording the magnetic information in the magnetic card on the basis of the identification result of said coercive force identifying step so that the magnetic information will be recorded in the magnetic card with the exciting current thus selected.

26. The magnetic card recording/reproducing method as claimed in claim 25, wherein said coercive force identifying step comprises the steps of: supplying the recording magnetic head with pulse current at a predetermined period to record predetermined magnetic information for identifying the coercive force of the magnetic card, the pulse current being set to have a peak value which varies substantially linearly in accordance with the time lapse of feeding of the magnetic card; detecting a pre-insertion inductive voltage which is induced in accordance with the predetermined magnetic information recorded in the magnetic card; and identifying the coercive force of the magnetic card on the basis of a judgment as to whether the inductive voltage detected in said detection step exceeds a predetermined reference value more early than a predetermined time.

27. The magnetic card recording/reproducing method as claimed in claim 25, wherein said coercive force identifying step further comprises steps of: detecting a first inductive voltage which is induced in a coil of a magnetic head dependently on the magnetic reluctance of the magnetic head when the magnetic card is far away from the magnetic head; and detecting a second inductive voltage which is induced in the coil of the magnetic head dependently of the magnetic reluctance when the magnetic card approaches to the magnetic head; comparing the first inductive voltage and the second inductive voltage; identifying the coercive force of the magnetic card on the basis of the comparison result of said comparing step; and selecting one of plural exciting current values as the optimum exciting current to be supplied to the magnetic head to record magnetic information in the magnetic card on the basis of the identification result of said identifying step.

\* \* \* \* \*